United States Patent
Fujii et al.

(10) Patent No.: US 10,913,806 B2
(45) Date of Patent: Feb. 9, 2021

(54) (METH)ACRYLIC CONDUCTIVE MATERIAL

(71) Applicant: OSAKA ORGANIC CHEMICAL INDUSTRY LTD., Osaka (JP)

(72) Inventors: Kanami Fujii, Osaka (JP); Yuya Tomimori, Osaka (JP); Mitsuhiro Kouda, Osaka (JP)

(73) Assignee: OSAKA ORGANIC CHEMICAL INDUSTRY LTD., Osaka (JP)

( * ) Notice: Subject to any disclaimer, the term of this patent is extended or adjusted under 35 U.S.C. 154(b) by 75 days.

(21) Appl. No.: 16/329,643

(22) PCT Filed: Jul. 19, 2017

(86) PCT No.: PCT/JP2017/026129
§ 371 (c)(1),
(2) Date: Feb. 28, 2019

(87) PCT Pub. No.: WO2018/055890
PCT Pub. Date: Mar. 29, 2018

(65) Prior Publication Data
US 2019/0194368 A1  Jun. 27, 2019

(30) Foreign Application Priority Data

Sep. 20, 2016 (JP) ................................ 2016-183308

(51) Int. Cl.
| C08F 20/28 | (2006.01) |
| C08L 33/08 | (2006.01) |
| H01B 1/24 | (2006.01) |
| H01B 1/22 | (2006.01) |
| C08F 20/14 | (2006.01) |
| C08J 5/18 | (2006.01) |
| H01B 1/20 | (2006.01) |
| H02N 1/00 | (2006.01) |

(52) U.S. Cl.
CPC .............. *C08F 20/28* (2013.01); *C08F 20/14* (2013.01); *C08J 5/18* (2013.01); *C08L 33/08* (2013.01); *H01B 1/20* (2013.01); *H01B 1/22* (2013.01); *H01B 1/24* (2013.01); *H02N 1/006* (2013.01); *C08J 2333/10* (2013.01); *C08J 2333/14* (2013.01)

(58) Field of Classification Search
CPC ... C08F 20/28; C08F 20/14; C08J 5/18; C08J 2333/10; C08J 2333/14; H02N 1/006; H01B 1/20
USPC ......................................................... 524/560
See application file for complete search history.

(56) References Cited

U.S. PATENT DOCUMENTS

2009/0178834 A1* 7/2009 Akutsu .................. C08L 71/00
174/260
2012/0146464 A1 6/2012 Kobayashi et al.
2014/0003634 A1 1/2014 Ito et al.
2014/0090884 A1* 4/2014 Kobayashi ............. H05K 1/095
174/388
2017/0022396 A1* 1/2017 Kimura .................. B32B 29/00

FOREIGN PATENT DOCUMENTS

| CN | 101542845 A | 9/2009 |
| CN | 103649231 A | 3/2014 |
| EP | 3056547 A1 | 8/2016 |
| JP | 8-151462 A | 6/1996 |
| JP | 2008-274019 A | 11/2008 |
| JP | 2009-245648 A | 10/2009 |
| JP | 2010-153364 A | 7/2010 |
| JP | 2010-257588 A | 11/2010 |
| JP | 2012224765 A * | 11/2012 |
| JP | 2013-35974 A | 2/2013 |
| JP | 2015-124321 A | 7/2015 |
| WO | WO 2009/102077 A1 | 8/2009 |
| WO | WO 2010/038753 A1 | 4/2010 |

(Continued)

OTHER PUBLICATIONS

Translation of JP 2012-224765 (patent application 2011-094282), Nov. 15, 2012. (Year: 2012).*
International Search Report for related International Application No. PCT/JP2017/026129 dated Oct. 16, 2017.
Office Action for corresponding Chinese Application No. 201780065428.6 dated Mar. 2, 2020 and its English translation.
Extended European Search Report for corresponding European Application No. 17852671.1 dated May 14, 2020.
Communication pursuant to Rules 70(2) and 70a(2) EPC for corresponding European Application No. 17852671.1 dated Jun. 3, 2020.
Sato, Daisuke et al.; "Anisotropic electroconductive adhesive and method for manufacturing connected structure using the anisotropic", Chemical Abstracts Service, Columbus, Ohio, XP002798707, Apr. 8, 2010.

(Continued)

*Primary Examiner* — Hui H Chin
(74) *Attorney, Agent, or Firm* — Renner, Otto, Boisselle & Sklar, LLP

(57) ABSTRACT

A (meth)acrylic conductive material which contains a (meth)acrylic elastomer and a conductive agent, and which is characterized in that: the (meth)acrylic elastomer is obtained by polymerizing a monomer component containing a (meth)acrylic monomer represented by formula (I)

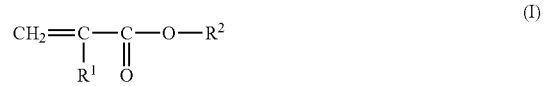

(wherein $R^1$ represents a hydrogen atom or a methyl group; and $R^2$ represents an alkyl group having 1-10 carbon atoms, which may have a hydroxyl group or a halogen atom, or an alkoxyalkyl group having 2-12 carbon atoms, which may have a hydroxyl group); and the (meth)acrylic elastomer has a weight average molecular weight of 1,200,000 to 10,000,000 and a molecular weight distribution (weight average molecular weight/number average molecular weight) of 1-6.

10 Claims, 3 Drawing Sheets

(56) References Cited

FOREIGN PATENT DOCUMENTS

WO     WO 2011/049214 A1    4/2011
WO     WO 2015/152201 A1    10/2015

OTHER PUBLICATIONS

Second Office Action for corresponding Chinese Application No. 201780065428.6 dated Aug. 31, 2020 and its English translation.

* cited by examiner

(METH)ACRYLIC CONDUCTIVE MATERIAL

TECHNICAL FIELD

The present invention relates to a (meth)acrylic conductive material. More specifically, the present invention relates to a (meth)acrylic conductive material which can be suitably used as a conductive film that can be suitably used in, for example, actuators, sensors used in industrial robots or the like, wiring, electrodes, substrates, power generating elements, speakers, microphones, noise cancellers, transducers, artificial muscles, small pumps, medical instrument, and the like, and as a raw material of the conductive film.

BACKGROUND ART

As a conductive material, a flexible conductive material having a carbon nanotube rubber composition consisting of carbon nanotube, rubber, and ionic liquid (see for example Patent Literature 1), a matrix, and a conductive material dispersed in the matrix, the flexible conductive material comprising a first polymer, in which the matrix has a function to disperse the conductive material, crosslinked with a second polymer that can be crosslinked with the first polymer (see for example Patent Literature 2) and the like have been proposed. However, such conductive materials all have excellent flexibility (elasticity) and conductivity, but have poor elongation in having elongation of about 10 to 400%, so that such conductive materials cannot be used in actuators with large displacement.

Therefore, there has been a demand in recent years for the development of a conductive film, which can be suitably used in actuators, sensors used in industrial robots or the like, wiring, electrodes, substrates, power generating elements, speakers, microphones, noise cancellers, transducers, artificial muscles, small pumps, medical instrument, and the like, and have excellent flexibility and elongation in a wide range of electrical resistance change ratios, and a conductive material with excellent usability and formability which can be suitably used as a raw material of such a conductive film.

CITATION LIST

Patent Literature

[PTL 1] International Publication No. WO 2009/102077
[PTL 2] Japanese Laid-Open Publication No. 2013-35974

SUMMARY OF INVENTION

Solution to Problem

The present invention provides a conductive film with excellent flexibility and elongation in a wide range of electrical resistance change ratios, a (meth)acrylic conductive material with excellent usability and formability that can be suitably used as a raw material of said conductive film and a method of manufacture thereof, and an actuator using said conductive film.

The present invention relates to, for example,
(1) A (meth)acrylic conductive material comprising a (meth)acrylic elastomer and a conductive agent, wherein the (meth)acrylic elastomer is prepared by polymerizing a monomer component comprising a (meth)acrylic monomer represented by formula (I):

[Chemical Formula 1]

wherein $R^1$ indicates a hydrogen atom or a methyl group, and $R^2$ indicates an alkyl group with 1 to 10 carbon atoms optionally having a hydroxyl group or a halogen atom or an alkoxyalkyl group with 2 to 12 carbon atoms optionally having a hydroxyl group, and the (meth)acrylic elastomer is characterized by a weight average molecular weight of 1.2 million to 10 million, and a molecular weight distribution (weight average molecular weight/number average molecular weight) of 1 to 6;
(2) The (meth)acrylic conductive material of (1), wherein the monomer component comprises a (meth)acrylic monomer represented by formula (I) wherein $R^2$ is an unsubstituted alkyl group;
(3) The (meth)acrylic conductive material of (2), wherein $R^2$ is an alkyl group with 1 to 4 carbon atoms;
(4) The (meth)acrylic conductive material of (3), wherein $R^2$ is ethyl;
(5) The (meth)acrylic conductive material of any one of (1) to (4), wherein the monomer component further comprises a (meth)acrylic monomer represented by formula (I) in which $R^2$ is an alkyl group with 1 to 10 carbon atoms having a hydroxyl group, or an acrylic acid;
(6) The (meth)acrylic conductive material of (5), wherein the monomer component comprises 2-hydroxyethyl acrylate; (7) A conductive film formed from the (meth)acrylic conductive material of any one of (1) to (6);
(8) An actuator prepared by using the conductive film of (7);
(9) A method of manufacturing a (meth)acrylic conductive material comprising a (meth)acrylic elastomer and a conductive agent, characterized by:
polymerizing a monomer component comprising a (meth)acrylic monomer represented by formula (I):

[Chemical Formula 2]

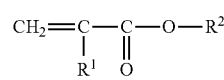

wherein $R^1$ indicates a hydrogen atom or a methyl group, and $R^2$ indicates an alkyl group with 1 to 10 carbon atoms optionally having a hydroxyl group or a halogen atom or an alkoxyalkyl group with 2 to 12 carbon atoms optionally having a hydroxyl group to prepare a (meth)acrylic elastomer with a weight average molecular weight of 1.2 million to 10 million and a molecular weight distribution (weight average molecular weight/number average molecular weight) of 1 to 6; and
mixing the resulting (meth)acrylic elastomer and the conductive agent;
(10) The method of (9), wherein the polymerization is bulk polymerization;
(11) The method of (9) or (10), wherein the monomer component comprises a (meth)acrylic monomer represented by formula (I) in which $R^2$ is an unsubstituted alkyl group;

(12) The method of (11), wherein $R^2$ is an alkyl group with 1 to 4 carbon atoms;
(13) The method of (12), wherein $R^2$ is ethyl;
(14) The method of any one of (9) to (13), wherein the monomer component further comprises a (meth)acrylic monomer represented by formula (I) in which $R^2$ is an alkyl group with 1 to 10 carbon atoms having a hydroxyl group, or an acrylic acid; and
(15) The method of any one of (9) to (14), wherein the monomer component further comprises 2-hydroxyethyl acrylate.

The present invention is intended so that one or more of the aforementioned features can be provided not only as the explicitly disclosed combinations, but also as other combinations thereof. Additional embodiments and advantages of the present invention are recognized by those skilled in the art by reading and understanding the following detailed description as needed.

Advantageous Effects of Invention

The present invention provides a conductive film with excellent flexibility and elongation in a wide range of electrical resistance change ratios, a (meth)acrylic conductive material with excellent usability and formability that can be suitably used as a raw material of said conductive film and a method of manufacture thereof, and an actuator using said conductive film.

DESCRIPTION OF EMBODIMENTS

Figure 1:
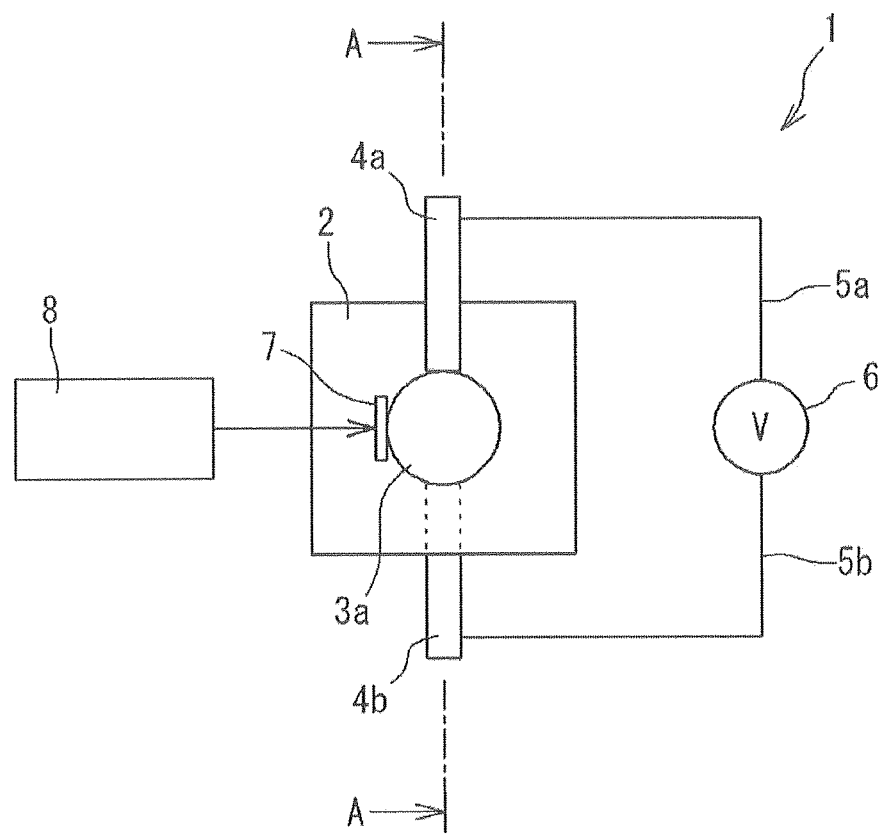
FIG. 1 is a schematic plan view depicting an embodiment of an actuator of the invention.

The (meth)acrylic conductive material of the invention, as discussed above, is a (meth)acrylic conductive material comprising a (meth)acrylic elastomer and a conductive agent, wherein the (meth)acrylic elastomer is prepared by polymerizing a monomer component comprising a (meth) acrylic monomer represented by formula (I):

[Chemical Formula 3]

wherein $R^1$ indicates a hydrogen atom or a methyl group, and $R^2$ indicates an alkyl group with 1 to 10 carbon atoms optionally having a hydroxyl group or a halogen atom or an alkoxyalkyl group with 2 to 12 carbon atoms optionally having a hydroxyl group, and the (meth)acrylic elastomer is characterized by a weight average molecular weight of 1.2 million to 10 million, and a molecular weight distribution (weight average molecular weight/number average molecular weight) of 1 to 6.

As used herein, "(meth)acryl" refers to "acryl" or "methacryl", and "(meth)acrylate" refers to "acrylate" or "methacrylate". Alkyl group is a concept encompassing alkyl groups having an alicyclic structure.

In a (meth)acrylic monomer represented by formula (I), $R^1$ is a hydrogen atom or a methyl group. Among $R^1$, a hydrogen atom is preferred from the viewpoint of obtaining a conductive film with excellent usability and formability and with excellent flexibility and elongation in a wide range of electrical resistance change ratios.

In a (meth)acrylic monomer represented by formula (I), $R^2$ is an alkyl group with 1 to 10 carbon atoms optionally having a hydroxyl group or a halogen atom or an alkoxyalkyl group with 2 to 12 carbon atoms optionally having a hydroxyl group.

Examples of halogen atoms include fluorine atoms, chlorine atoms, bromine atoms, iodine atoms, and the like. Among these halogen atoms, fluorine atoms are preferred from the viewpoint of obtaining a conductive film with excellent usability and formability and with excellent flexibility and elongation in a wide range of electrical resistance change ratios. The number of halogen atoms contained in an alkyl group cannot be generalized because the number varies depending on the number of carbon atoms of the alkyl group or the like, it is preferable that the number is appropriately adjusted to the extent that the objective of the invention is not obstructed.

Examples of alkyl group with 1 to 10 carbon atoms include, but are not limited in the present invention to, a methyl group, ethyl group, n-propyl group, isopropyl group, n-butyl group, isobutyl group, tert-butyl group, sec-butyl group, n-pentyl group, isoamyl group, n-hexyl group, isohexyl group, cyclohexyl group, n-octyl group, and the like.

Examples of alkyl group with 1 to 10 carbon atoms having a hydroxyl group include, but are not limited in the present invention to, a hydroxymethyl group, hydroxyethyl group, hydroxy n-propyl group, hydroxyisopropyl group, hydroxy n-butyl group, hydroxyisobutyl group, hydroxy tert-butyl group, and the like.

Examples of alkyl group with 1 to 10 carbon atoms having a halogen atom include, but are not limited in the present invention to, a trifluoromethyl group, trifluoroethyl group, trifluoropropyl group, trifluorobutyl group, and the like.

Examples of alkoxyalkyl group with 2 to 12 carbon atoms include, but are not limited in the present invention to, alkoxyalkyl groups having an alkoxy group with 1 to 6 carbon atoms and an alkyl group with 1 to 6 carbon atoms such as a methoxyethyl group, ethoxyethyl group, and methoxybutyl group.

Examples of alkoxyalkyl group with 2 to 12 carbon atoms having a hydroxyl group include, but are not limited in the present invention to, alkoxyalkyl groups having a hydroxyalkoxy group with 1 to 6 carbon atoms and an alkyl group with 1 to 6 carbon atoms such as a hydroxymethoxy ethyl group, hydroxyethoxy ethyl group, and hydroxymethoxy butyl group, and the like.

$R^2$ is preferably an alkyl group with 1 to 4 carbon atoms optionally having a hydroxyl group and a halogen group and an alkoxyalkyl group with 1 to 4 carbon atoms optionally having a hydroxyl group, more preferably an alkyl group with 1 to 2 carbon atoms optimally having a hydroxyl group or a halogen atom and an alkoxyalkyl group with 1 to 2 carbon atoms optionally having a hydroxyl group, and still more preferably an ethyl group and a methoxy group, from the viewpoint of obtaining a conductive film with excellent usability and formability and with excellent flexibility and elongation in a wide range of electrical resistance change ratios.

A (meth)acrylic monomer represented by formula (I) is preferably a (meth)acrylic monomer in which $R^1$ is a hydrogen atom or a methyl group and $R^2$ is an alkyl group with 1 to 10 carbon atoms in formula (I) such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, n-pentyl (meth)acrylate, isoamyl (meth)acrylate, n-hexyl (meth)acrylate, methylpentyl (meth)acrylate, n-octyl (meth)acrylate, nonanol (meth)acrylate, or cyclohexyl (meth)acrylate, a (meth)acrylic monomer in which $R^1$ is a hydrogen atom or a methyl group and $R^2$ is an alkyl group with 1 to 10 carbon atoms having a hydroxyl group in formula (I), such as hydroxyethyl (meth)acrylate, hydroxypropyl (meth)acrylate, or hydroxybutyl (meth)acrylate, a (meth)acrylic monomer in which $R^1$ is a hydrogen atom or a methyl group and $R^2$ is an alkyl group with 1 to 10 carbon atoms having a halogen atom in formula (I) such as 2,2,2-trifluoroethyl acrylate, a (meth)acrylic monomer in which $R^1$ is a hydrogen atom or a methyl group and $R^2$ is an alkoxyalkyl group with 2 to 12 carbon atoms in formula (I) such as methoxyethyl (meth)acrylate, ethoxyethyl (meth)acrylate, methoxybutyl (meth)acrylate, or phenoxyethyl acrylate, or a (meth)acrylic monomer in which $R^1$ is a hydrogen atom or a methyl group and $R^2$ is an alkoxyalkyl group with 2 to 12 carbon atoms having a hydroxyl group in formula (I) such as diethylene glycol mono(meth)acrylate, more preferably ethyl (meth)acrylate or hydroxyethyl (meth)acrylate, and still more preferably ethyl acrylate or hydroxyethyl acrylate, from the viewpoint of obtaining a conductive film with excellent usability and formability and with excellent flexibility and elongation in a wide range of electrical resistance change ratios. These (meth)acrylic monomers can each be used individually, or two or more can be used in combination. In one embodiment, $R^2$ is preferably an unsubstituted alkyl group, and $R^2$ is more preferably an alkyl group with 1 to 4 carbon atoms, and $R^2$ is still more preferably ethyl. In one embodiment, $R^2$ preferably further comprises a monomer component, which is an alkyl group with 1 to 10 carbon atoms having a hydroxyl group. In a more preferred embodiment, it is advantageous that a monomer component further comprises 2-hydroxyethyl acrylate. Although not wishing to be bound by any theory, this is because a good result is attained in terms of durability and/or hysteresis (residual strain). In one embodiment, a monomer component preferably further comprises acrylic acid. Although not wishing to be bound by any theory, this is because a material with low volume resistivity is obtained.

A monomer component can be comprised of only a (meth)acrylic monomer represented by formula (I), but a monomer that can copolymerize with a (meth)acrylic monomer represented by formula (I) (hereinafter, referred to as a copolymerizable monomer) can be included as needed to the extent that the objective of the present invention is not obstructed.

Examples of the copolymerizable monomer include, but are not limited in the present invention to, carboxyl group containing monomers, carboxylic acid alkyl ester monomers other than the (meth)acrylic monomers represented by formula (I), amide group containing monomers, aryl group containing monomers, styrene monomers, nitrogen atom containing monomers, fatty acid vinyl ester monomers, betaine monomers, glycidyl containing monomers, silicone containing monomers, cycloalkyl group containing monomers, and the like. These monomers can each be used individually, or two or more can be used in combination.

Examples of carboxyl group containing monomers include, but are not limited in the present invention to, (meth)acrylic acid, maleic acid, fumaric acid, citraconic acid, mesaconic acid, itaconic acid, crotonic acid, and the like. These monomers can each be used individually, or two or more can be used in combination.

Examples of carboxylic acid alkyl ester monomers other than (meth)acrylic monomers represented by formula (I) include, but are not limited in the present invention to, alkyl acrylate with 11 to 20 carbon atoms in an alkyl group such as stearyl (meth)acrylate, dodecyl (meth)acrylate, itaconic acid alkyl esters with 1 to 4 carbon atoms in an alkyl group such as methyl itaconate and ethyl itaconate, and the like. These monomers can each be used individually, or two or more can be used in combination.

Examples of amide group containing monomers include, but are not limited in the present invention to, alkyl (meth)acrylamide with 1 to 8 carbon atoms in an alkyl group such as N-methyl (meth)acrylamide, N-ethyl (meth)acrylamide, N-propyl (meth)acrylamide, N-isopropyl (meth)acrylamide, N-tert-butyl (meth)acrylamide, N-octyl (meth)acrylamide, N,N-dimethyl (meth)acrylamide, and N,N-diethyl (meth)acrylamide. These monomers can each be used individually, or two or more can be used in combination.

Examples of aryl group containing monomers include, but are not limited in the present invention to, aryl (meth)acrylate with 6 to 12 carbon atoms in an aryl group such as benzyl (meth)acrylate. Examples of an aryl group include a phenyl group ($C_6H_5$—), tolyl group ($CH_3C_6H_4$—), xylyl group (($CH_3)_2C_6H_3$—), naphthyl group ($C_{10}H_8$—), and the like. An aryl group may have a hydroxyl group. An example thereof includes 4-hydroxyphenyl (meth)acrylate and the like. These monomers can each be used individually, or two or more can be used in combination.

Examples of styrene monomers include, but are not limited in the present invention to, styrene, α-methylstyrene, and the like. These monomers can each be used individually, or two or more can be used in combination.

Examples of nitrogen atom containing monomers include, but are not limited in the present invention to, N-vinylpyrrolidone, N-vinylcaprolactam, and the like. These monomers can each be used individually, or two or more can be used in combination.

Examples of fatty acid vinyl ester monomers include, but are not limited in the present invention to, vinyl acetate, vinyl propionate, and the like. These monomers can each be used individually, or two or more can be used in combination.

Examples of betaine monomers include, but are not limited in the present invention to, sulfobetaine monomers such as N-(meth)acryloyloxyalkyl-N,N-dimethylammonium alkyl-α-sulfobetaine, such as N-acryloyloxymethyl-N,N-dimethylammonium methyl-α-sulfobetaine, N-methacryloyloxymethyl-N,N-dimethylammonium methyl-α-sulfobetaine, N-acryloyloxymethyl-N,N-dimethylammonium ethyl-α-sulfobetaine, N-methacryloyloxymethyl-N,N-dimethylammonium ethyl-α-sulfobetaine, N-acryloyloxymethyl-N,N-dimethylammonium propyl-α-sulfobetaine, N-methacryloyloxymethyl-N,N-dimethylammonium propyl-α-sulfobetaine, N-acryloyloxymethyl-N,N-dimethylammonium butyl-α-sulfobetaine, N-methacryloyloxymethyl-N,N-dimethylammonium butyl-α-sulfobetaine, N-acryloyloxyethyl-N,N-dimethylammonium methyl-α-sulfobetaine, N-methacryloyloxyethyl-N,N-dimethylammonium methyl-α-sulfobetaine, N-acryloyloxyethyl-N,N-dimethylammonium ethyl-α-sulfobetaine, N-methacryloyloxyethyl-N,N-dimethylammonium ethyl-α-sulfobetaine, N-acryloyloxyethyl-N,N-dimethylammonium propyl-α-sulfobetaine, N-methacryloyloxyethyl-N,N-dimethylammonium propyl-α-sulfobetaine, N-acryloyloxyethyl-N,N-dimethylammonium butyl-α-sulfobetaine, N-methacryloyloxyethyl-N,N-dimethylammonium butyl-α-sulfobetaine, N-acryloyloxypropyl-N,N-dimethylammonium methyl-α-sulfobetaine, N-methacryloyloxypropyl-N,N-dimethylammonium methyl-α-sulfobetaine, N-acryloyloxypropyl-N,N-dimethylammonium ethyl-α-sulfobetaine, N-methacryloyloxypropyl-N,N-dimethylammonium ethyl-α-sulfobetaine, N-acryloyloxypropyl-N,N-dimethylammonium propyl-α-sulfobetaine, N-methacryloyloxypropyl-N,N-dimethylammonium propyl-α-sulfobetaine, N-acryloyloxypropyl-N,N-dimethylammonium butyl-α-sulfobetaine, N-methacryloyloxypropyl-N,N-dimethylammonium butyl-α-sulfobetaine, N-acryloyloxybutyl-N,N-dimethylammonium methyl-α-sulfobetaine, N-methacryloyloxybutyl-N,N-dimethylammonium methyl-α-sulfobetaine, N-acryloyloxybutyl-N,N-dimethylammonium ethyl-α-sulfobetaine, N-methacryloyloxybutyl-N,N-dimethylammonium ethyl-α-sulfobetaine, N-acryloyloxybutyl-N,N-dimethylammonium propyl-α-sulfobetaine, N-methacryloyloxybutyl-N,N-dimethylammonium propyl-α-sulfobetaine, N-acryloyloxybutyl-N,N-dimethylammonium butyl-α-sulfobetaine, N-methacryloyloxybutyl-N,N-dimethylammonium butyl-α-sulfobetaine, and the like. These sulfobetaine monomers can each be used individually, or two or more can be used in combination.

A glycidyl group containing monomer is a monomer containing a glycidyl group

[Chemical Formula 4]

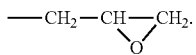

Examples thereof include, but are not limited in the present invention to, glycidyl (meth)acrylate, glycidyl-[—O—(CH$_2$)$_n$—]$_m$-(meth)acrylate (wherein n is an integer from 1 to 4, and m is an integer from 1 to 20). These monomers can each be used individually, or two or more can be used in combination.

A silicone group containing monomer is a monomer containing a (R$^c$)—[—O—Si(R$^a$)(R$^b$)]$_x$-group. Examples thereof include, but are not limited in the present invention to, silicone group esters of (meth)acrylic acid, wherein R$^a$, R$^b$ and R$^c$ can be selected from any chemically acceptable group (e.g., alkyl group, alkoxy group, cycloalkyl group, cycloalkyloxy group, aryl group, aryloxy group, or the like), and x is any integer, such as 1, 2, 3, or 4. Examples of a silicone group include, but are not limited in the present invention to, polydimethylsiloxyl group, trialkoxysilyl group (e.g., trimethoxysilyl group and triethoxysilyl group), and the like. These monomers can each be used individually, or two or more can be used in combination.

A cycloalkyl group containing monomer is a monomer containing a cycloalkyl group. Examples thereof include, but are not limited in the present invention to, C$_{3-12}$ cycloalkyl (meth)acrylate. As used herein, "cycloalkyl group" refers to a monocyclic or polycyclic saturated hydrocarbon group, including those with a crosslinked structure. For example, "C$_{3-12}$ cycloalkyl group" refers to a cyclic alkyl group with 3 to 12 carbon atoms. Specific examples for "C$_{3-12}$ cycloalkyl group" include, but are not limited in the present invention to, cyclopropyl group, cyclobutyl group, cyclopentyl group, cyclohexyl group, cycloheptyl group, cyclooctyl group, adamantyl group, isobornyl group, and the like. These monomers can each be used individually, or two or more can be used in combination.

The content of (meth)acrylic monomer represented by formula (I) in a monomer component is preferably 90% by mass or greater, more preferably 93% by mass or greater, and still more preferably 95% by mass or greater from the viewpoint of obtaining a conductive film with excellent usability and formability and with excellent flexibility and elongation in a wide range of electrical resistance change ratios, and the upper limit value thereof is 100% by mass. The copolymerizable monomer content in a monomer component is preferably 10% by mass or less, more preferably 7% by mass or less, and still more preferably 5% by mass or less from the viewpoint of obtaining a conductive film with excellent usability and formability and with excellent flexibility and elongation in a wide range of electrical resistance change ratios, and the lower limit value thereof is 0% by mass.

A (meth)acrylic elastomer can be obtained by bulk polymerization of a monomer component. The present invention can polymerize a raw material monomer component such as a conventional acrylic rubber by bulk polymerization instead of polymerization by solution polymerization, emulsion polymerization, suspension polymerization, or the like. A (meth)acrylic elastomer with a weight average molecular weight of 1.2 million to 10 million and a molecular weight distribution (weight average molecular weight/number average molecular weight) of 1 to 6 can be readily prepared.

A (meth)acrylic elastomer can be prepared by polymerizing a monomer component by irradiating ultraviolet rays with a specific illuminance. Such ultraviolet rays can be irradiated by those skilled in the art at any setting. When a (meth)acrylic elastomer is prepared, a drying process to remove a solvent, which is a complicated process, is not needed when the elastomer is prepared by polymerization using ultraviolet rays, resulting in excellent usability.

As used herein, an ultraviolet ray refers to an electromagnetic wave with a shorter wavelength than visible light but longer than X-rays. The upper limit of the short wavelength end of visible light is 400 nm. Ultraviolet rays can be defined as electromagnetic waves with an equal or less wavelength. The lower limit wavelength of ultraviolet rays is about 10 nm, and an electromagnetic wave with a longer wavelength is understood to be within the scope of ultraviolet rays. The wavelength of ultraviolet rays used in the present invention can be any wavelength. A suitable wavelength can be selected depending on the objective. For example, ultraviolet rays with any wavelength can be used, as long as an initial effect can be attained with respect to a monomer in the present invention. Typically, ultraviolet rays have a wavelength that can be irradiated with a light source used in the Examples. Specifically, a light source of about 150 nm to 400 nm is used, which is preferably 300 nm to 400 nm.

The preferred illuminance of ultraviolet rays used in the present invention varies by the starting material. An ultraviolet ray irradiation apparatus is not particularly limited. Examples thereof include low pressure mercury lamp, medium pressure mercury lamp, high pressure mercury lamp, ultra-high pressure mercury lamp, metal halide lamp, black light lamp, electrodeless UV lamp, short arc lamp, LED, and the like.

When a monomer component is polymerized, a polymerization initiator can be used. Examples of polymerization initiators include photoinitiators, thermal initiators, and the like. Among such polymerization initiators, photoinitiators are preferred from the viewpoint of not leaving a thermal history to a (meth)acrylic elastomer.

Examples of photoinitiators include, but are not limited in the present invention to, photoradical polymerization initiators such as 2,4,6-trimethylbenzoyl diphenylphosphine oxide, 2,2'-bis(o-chlorophenyl)-4,4', 5,5'-tetraphenyl-1,1'-biimidazole, 2,4,6-tris(trichloromethyl)-1,3,5-triazine, 2,4-bis(trichloromethyl)-6-(p-methoxyphenylvinyl)-1,3,5-triazine, diphenyliodonium tetrafluoroborate, diphenyliodonium hexafluorophosphate, 4,4'-di-tert-butyldiphenyliodonium tetrafluoroborate, 4-diethylaminophenylbenzene diazonium hexafluorophosphate, benzoin, 2-hydroxy-2-methyl-1-phenylpropan-2-one, benzophenone, thioxanthone, 2,4,6-trimethylbenzoyl diphenylacylphosphine oxide, tetramethylammonium triphenylbutyl borate, diphenyl-4-phenylthiophenylsulfonium hexafluorophosphate, 2,2-dimethoxy-1,2-diphenylethan-1-one, phenylglyoxylic acid methyl ester, 2-methyl-1-[4-(methylthio)phenyl]-2-morpholinopropane-1-one, bis(2,4,6-trimethylbenzoyl)-phenylphosphine oxide, 1,2-octanedione, 1-[4-(phenylthio)-2-(o-benzoyloxime)], and bis(η5-2,4-cyclopentadien-1-yl)bis[2,6-difluoro-3-(1H-pyrrole-1-yl)phenyltitanium], photocationic ring-opening polymerization initiators such as 2,4,6-tris(trichloromethyl)-1,3,5-triazine, 2,4-bis(trichloromethyl)-6-(p-methoxyphenylvinyl)-1,3,5-triazine, diphenyliodonium tetrafluoroborate, 4,4'-di-tert-butyldiphenyliodonium tetrafluoroborate, 4-diethylaminophenylbenzene diazonium hexafluorophosphate, and diphenyl-4-phenylthiophenylsulfonium hexafluorophosphate, and the like. These photoinitiators can each be used individually, or two or more can be used in combination.

Examples of thermal initiators include, but are not limited in the present invention to, azo polymerization initiators such as dimethyl-2,2'-azobis(2-methylpropionate), 2,2'-azobisisobutyronitrile (AIBN), 2,2'-azobis(2,4-dimethylvaleronitrile) (ADVN), dimethyl 2,2'-azobisisobutyrate, and azobisdimethylvaleronitrile, peroxide polymerization initiators such as benzoyl peroxide, potassium peroxide, and ammonium persulfate, and the like. These polymerization initiators can each be used individually, or two or more can be used in combination.

The amount of polymerization initiator cannot be generalized because the amount varies depending on the type of the polymerization inhibitor or the like, but is generally preferable at about 0.01 to 20 parts by mass per 100 parts by mass of monomer component.

When a monomer component is polymerized, a chain transfer agent can be used to adjust the molecular weight of the resulting (meth)acrylic elastomer. Examples of chain transfer agents include, but are not limited in the present invention to, compounds having a thiol group such as lauryl mercaptan, dodecyl mercaptan, and thioglycerol, inorganic salts such as sodium hypophosphite and sodium bisulfite, and the like. These chain transfer agents can each be used individually, or two or more can be used in combination. The amount of chain transfer agent cannot be generalized because the amount varies depending on the type of the chain transfer agent or the like, but is generally preferable at about 0.01 to 10 parts by mass per 100 parts by mass of monomer component.

The atmosphere where a monomer component is polymerized is not particularly limited. The atmosphere can be ambient air, or inert gas such as nitrogen gas or argon gas.

The temperature at which a monomer component is polymerized is not particularly limited, and is generally preferred to be a temperature of about 5 to 100° C. The time required for polymerizing a monomer component cannot be generalized and thus can be any period of time because the time varies depending on the polymerization conditions, but is generally about 1 to 20 hours.

A polymerization reaction can be ended at any time when the amount of residual monomer component is 20% by mass or less. The amount of residual monomer component can be measured using, for example, gel permeation chromatography (GPC).

A (meth)acrylic elastomer can be obtained by bulk polymerization of a monomer component in the above manner.

A (meth)acrylic elastomer is characterized by a weight average molecular weight of 1.2 million to 10 million and a molecular weight distribution (weight average molecular weight/number average molecular weight) of 1 to 6. The (meth)acrylic conductive material of the invention comprises a (meth)acrylic elastomer with a weight average molecular weight of 1.2 million to 10 million and a molecular weight distribution (weight average molecular weight/number average molecular weight) of 1 to 6 and a conductive agent, thus achieving an excellent effect of forming a conductive film with excellent usability and formability and with excellent flexibility and elongation in a wide range of electrical resistance change ratios.

The weight average molecular weight of a (meth)acrylic elastomer is 1.2 million or greater, 1.3 million or greater, 1.4 million or greater, 1.5 million or greater, 1.6 million or greater, 1.7 million or greater, preferably 1.8 million or greater, 1.9 million or greater, and more preferably 2 million or greater from the viewpoint of obtaining a conductive film with excellent usability and formability and with excellent flexibility and elongation in a wide range of electrical resistance change ratios, and is 10 million or less, preferably 8 million or less, 7 million or less, 6 million or less, more preferably 5 million or less, 4 million or less, and still more preferably 3 million or less from the viewpoint of obtaining a conductive film with excellent usability and formability and with excellent flexibility and elongation in a wide range of electrical resistance change ratios. In the present invention, the weight average molecular weight of a (meth)acrylic elastomer is a value measured based on the method described in the following Examples.

The number average molecular weight of a (meth)acrylic elastomer is preferably 500 thousand and or greater, more preferably 550 thousand or greater, and still more preferably 600 thousand or greater from the viewpoint of obtaining a conductive film with excellent usability and formability and with excellent flexibility and elongation in a wide range of electrical resistance change ratios, and is preferably 800 thousand or less, more preferably 750 thousand or less, and still more preferably 700 thousand or less from the viewpoint of obtaining a conductive film with excellent usability and formability and with excellent flexibility and elongation in a wide range of electrical resistance change ratios. In the present invention, the number average molecular weight of a (meth)acrylic elastomer is a value measured based on the method described in the following Examples.

The molecular weight distribution (weight average molecular weight/number average molecular weight; the same applies hereinafter) of a (meth)acrylic elastomer is 1 or greater, 1.5 or greater, preferably 2 or greater, 2.5 or greater, and more preferably 3 or greater or 3.5 or greater from the viewpoint of obtaining a conductive film with excellent usability and formability and with excellent flexibility and elongation in a wide range of electrical resistance change ratios, and is 6 or less, 5.5 or less, 5 or less, preferably 4.5 or less, and more preferably 4 or less from the viewpoint of obtaining a conductive film with excellent usability and formability and with excellent flexibility and elongation in a wide range of electrical resistance change ratios. In the present invention, the molecular weight distribution of a (meth)acrylic elastomer is a value found based on the method described in the following Examples.

Examples of a conductive agent include, but are not limited in the present invention to, carbon material such as natural graphite such as flake graphite, graphite such as artificial graphite, carbon black such as acetylene black, Ketjenblack, channel black, furnace black, lamp black, and thermal black, graphene, carbon nanotube, and fullerene; conductive fibers such as carbon fiber and metal fiber; carbon fluoride; powder of particles of metal such as copper, nickel, aluminum, and silver; conductive whisker such as zinc oxide and potassium titanate; conductive metal oxides such as titanium oxide; organic conductive materials such as polyphenolene derivatives; and the like. These conductive agents can each be used individually, or two or more can be used in combination. Among these conductive agents, carbon nanotubes, carbon black, graphene, and metal particles are preferred, and carbon nanotubes, carbon black, graphene, and silver particles are more preferred from the viewpoint of obtaining a conductive film with excellent usability and formability and with excellent flexibility and elongation in a wide range of electrical resistance change ratios, and carbon nanotubes are still more preferred from the viewpoint of obtaining a (meth)acrylic conductive material exhibiting a large displacement when a low voltage is applied.

The percentage of conductive material solid content among all solid portions of a (meth)acrylic elastomer and the conductive agent cannot be generalized because the content varies depending on the type of the conductive agent or the like, but in general, it is preferably 1% by mass or greater from the viewpoint of obtaining a conductive film with excellent usability and formability and with excellent flexibility and elongation in a wide range of electrical resistance change ratios, and is preferably 100% by mass or less from the viewpoint of obtaining a conductive film with excellent usability and formability and with excellent flexibility and elongation in a wide range of electrical resistance change ratios.

Examples of carbon nanotubes include, but are not limited in the present invention to, single wall carbon nanotubes with a hollow cylindrical structure from rolling a sheet of graphite (graphene sheet) into a tubular shape, multi-wall carbon nanotubes with a structure from concentrically laminating multiple single wall carbon nanotubes with different diameters, single wall carbon nanotubes manufactured by the super growth method, carbon neocons having a shape of a single wall carbon nanotube with an end thereof closed in a conical shape, carbon nanotubes encapsulating fullerene therein, and the like. These carbon nanotubes can each be used individually, or two or more can be used in combination. Among these carbon nanotubes, multi-wall carbo nanotubes are preferred from the viewpoint of obtaining a (meth)acrylic conductive material exhibiting a large displacement when a low voltage is applied.

The length of a carbon nanotube is preferably 0.1 to 1000 µm and more preferably 1 to 500 µm from the viewpoint of obtaining a conductive film with excellent usability and formability and with excellent flexibility and elongation in a wide range of electrical resistance change ratios, and still more preferably 1 to 90 µm from the viewpoint of obtaining a (meth)acrylic conductive material exhibiting a large displacement at a low voltage.

The diameter of a carbon nanotube is preferably 10 to 50 nm and more preferably 10 to 20 nm from the viewpoint of obtaining a conductive film with excellent usability and formability and with excellent flexibility and elongation in a wide range of electrical resistance change ratios.

The percentage of carbon nanotube solid content among all solid portions of a (meth)acrylic elastomer and the carbon nanotube is preferably 1% by mass or greater, more preferably 1.5% by mass or greater, and still more preferably 2% by mass or greater from the viewpoint of obtaining a conductive film with excellent usability and formability and with excellent flexibility and elongation in a wide range of electrical resistance change ratios, and is preferably 25% by mass or less, more preferably 20% by mass or less, and still more preferably 15% by mass or less from the viewpoint of obtaining a conductive film with excellent usability and formability and with excellent flexibility and elongation in a wide range of electrical resistance change ratios, and is even more preferably 3.5 to 10% by mass from the viewpoint of obtaining a (meth)acrylic conductive material exhibiting a large displacement when a low voltage is applied.

As used herein, the percentage of conductive agent solid content among all solid portions of a (meth)acrylic elastomer and the conductive agent refers to a value found based on the equation:

$$[\text{Percentage of conductive agent solid content among all solid portions of a (meth)acrylic elastomer and the conductive agent (\% by mass)}] = [(\text{Solids of conductive agent})/\{\text{solids of (meth)acrylic elastomer} + \text{solids of conductive agent}\}] \times 100.$$

Examples of shapes of carbon black include, but are not limited in the present invention to, spherical, ellipsoidal, spindle-shape, granular, sheet-shape, columnar, and the like. It is preferable that the shape of carbon black is appropriately determined depending on the application of (meth)acrylic conductive material or the like.

The mean particle size of carbon black is preferably 30 µm or less, more preferably 20 µm or less, still more preferably 10 µm or less, and even more preferably 5 µm or less from the viewpoint of obtaining a conductive film with excellent usability and formability and with excellent flexibility and elongation in a wide range of electrical resistance change ratios. The mean particle size of carbon black refers to the mean particle size of D50 measured using a laser diffraction/scattering particle size distribution analyzer [HORIBA, Ltd., model number: LA-910].

The percentage of carbon black solid content among all solid portions of a (meth)acrylic elastomer and the carbon black is preferably 1% by mass or greater, more preferably 3% by mass or greater, and still more preferably 5% by mass or greater from the viewpoint of obtaining a conductive film with excellent usability and formability and with excellent flexibility and elongation in a wide range of electrical resistance change ratios, and is preferably 50% by mass or less, more preferably 30% by mass or less, and still more preferably 20% by mass or less from the viewpoint of obtaining a conductive film with excellent usability and formability and with excellent flexibility and elongation in a wide range of electrical resistance change ratios.

The mean particle size of graphene is preferably 0.3 to 500 µm, more preferably 0.5 to 100 µm, still more preferably 1 to 50 µm, and even more preferably 3 to 20 µm from the viewpoint of obtaining a conductive film with excellent usability and formability and with excellent flexibility and elongation in a wide range of electrical resistance change ratios. The mean particle size of graphene refers to the mean particle size found in the same manner as that of carbon black discussed above.

The thickness of graphene is preferably 0.1 to 500 nm, more preferably 0.5 to 100 nm, still more preferably 1 to 50 nm, and even more preferably 1 to 20 nm from the viewpoint of obtaining a conductive film with excellent usability and formability and with excellent flexibility and elongation in a wide range of electrical resistance change ratios.

The percentage of graphene solid content among all solid portions of a (meth)acrylic elastomer and the graphene is preferably 5% by mass or greater, more preferably 8% by mass or greater, and still more preferably 10% by mass or greater from the viewpoint of obtaining a conductive film with excellent usability and formability and with excellent flexibility and elongation in a wide range of electrical resistance change ratios, and is preferably 25% by mass or less from the viewpoint of obtaining a conductive film with excellent usability and formability and with excellent flexibility and elongation in a wide range of electrical resistance change ratios.

Examples of shapes of metal particles include, but are not limited in the present invention to, spherical, ellipsoidal, spindle-shape, granular, sheet-shape, columnar, flaky, flat, and the like. It is preferable that the shape of metal particles is appropriately determined depending on the application of (meth)acrylic conductive material or the like.

The mean particle size of metal particles is preferably 0.3 to 50 µm, more preferably 0.5 to 30 µm, and still more preferably 1 to 10 µm from the viewpoint of obtaining a conductive film with excellent usability and formability and with excellent flexibility and elongation in a wide range of electrical resistance change ratios. The mean particle size of metal particles refers to the mean particle size found in the same manner as that of carbon black discussed above.

The metal particle solid content among all solid portions of a (meth)acrylic elastomer and the metal particles is preferably 50% by mass or greater, more preferably 55% by mass or greater, and still more preferably 60% by mass or greater from the viewpoint of obtaining a conductive film with excellent usability and formability and with excellent flexibility and elongation in a wide range of electrical resistance change ratios, and is preferably 500% by mass or less, more preferably 400% by mass or less, further more preferably 100% by mass or less, still more preferably 85% by mass or less, and even more preferably 83% by mass or less from the viewpoint of obtaining a conductive film with excellent usability and formability and with excellent flexibility and elongation in a wide range of electrical resistance change ratios.

A conductive agent can be used as a dispersion prepared by dispersing the conductive agent in a dispersion medium. Examples of dispersion media include, but are not limited in the present invention to, isopropyl alcohol, toluene, N-methyl-2-pyrrolidone, cyclopentanone, and the like. These dispersion media can each be used individually, or two or more can be used in combination. The amount of dispersion medium can be appropriately determined by considering the type and amount of conductive agent, type and amount of (meth)acrylic elastomer to be mixed, or the like.

The amount of non-volatile portion in a conductive agent dispersion is preferably 1% by mass or greater and more preferably 3% by mass or greater from the viewpoint of obtaining a conductive film with excellent usability and formability and with excellent flexibility and elongation in a wide range of electrical resistance change ratios, and is preferably 60% by mass or less and more preferably 50% by mass or less from the viewpoint of improving handlability.

The amount of non-volatile portion in a conductive agent dispersion refers to a value found by weighing out 1 g of the conductive agent dispersion, drying the dispersion for 1 hour at a temperature of 130° C. with a hot air dryer, and using the resulting residual as a non-volatile portion, based on the equation:

$$[\text{Amount of non-volatile portion in conductive agent dispersion (\% by mass)}] = ([\text{mass of residual}]/[1 \text{ g of conductive agent dispersion}]) \times 100$$

The (meth)acrylic conductive material of the invention can be readily manufactured, for example, by dissolving a (meth)acrylic elastomer in a solvent and mixing the resulting resin solution with a conductive agent, and an additive or the like as needed. These components can be mixed in any order. For example, these components can be mixed together.

Examples of solvents to which a (meth)acrylic elastomer is dissolved include, but are not limited in the present invention to, aromatic solvents such as toluene and xylene; alcohol solvents such as isopropyl alcohol and n-butyl alcohol; ether solvents such as propylene glycol methyl ether, dipropylene glycol methyl ether, ethyl cellosolve, and butyl cellosolve; ester solvents such as ethyl acetate, butyl acetate, cellosolve acetate, and diethylene glycol monobutyl acetate; ketone solvents such as acetone, methyl ethyl ketone, methyl isobutyl ketone, and diacetone alcohol; amide solvents such as dimethylformamide; and other organic solvents. These solvents can each be used individually, or two or more can be used in combination. The amount of solvent is not particularly limited, but is generally preferred at about 500 to 1500 parts by mass per 100 parts by mass of a (meth)acrylic elastomer.

The (meth)acrylic conductive material of the invention can comprise an additive, to the extent the objective of the present invention is not obstructed. Examples of additives include, but are not limited in the present invention to, dispersants, other polymers, neutralizing agents, colorants, UV blocking agents, anti-aging agents, and the like.

The (meth)acrylic conductive material of the invention can contain a suitable amount of a viscosity modifier to adjust the viscosity thereof. Examples of the viscosity modifier include, but are not limited in the present invention to, acrylic polymers, acrylonitrile polymers, (meth)acrylamide polymers, polyamide, vinyl chloride polymers, urethane polymers, polyesters, carboxymethyl cellulose, and the like. These and other polymers can each be used individually, or two or more can be used in combination.

The (meth)acrylic conductive material of the invention can be neutralized with a neutralizing agent as needed. Examples of neutralizing agents include, but are not limited in the present invention to, inorganic base compounds such as sodium hydroxide and potassium hydroxide; organic base compounds such as monoethanolamine, dimethylethanolamine, diethylethanolamine, triethanolamine, morpholine, aminomethyl propanol, aminomethyl propanediol, octylamine, tributylamine, and aniline, and the like. These neutralizing agents can each be used individually, or two or more can be used in combination.

The content of non-volatile portions in the (meth)acrylic conductive material of the invention is preferably 3% by mass or greater and more preferably 5% by mass or greater from the viewpoint of obtaining a conductive film with excellent usability and formability and with excellent flexibility and elongation in a wide range of electrical resistance change ratios, and is preferably 70% by mass or less and more preferably 60% by mass or less from the viewpoint of improving handlability.

The amount of non-volatile portion in the (meth)acrylic conductive material of the invention refers to a value found by weighing out 1 g of the (meth)acrylic conductive material, drying the material for 1 hour at a temperature of 130° C. with a hot air dryer, and using the resulting residual as a non-volatile portion, based on the equation:

[Amount of non-volatile portion in (meth)acrylic conductive material (% by mass)]=([mass of residual]/[1 g of (meth)acrylic conductive material])×100.

Since the (meth)acrylic conductive material of the invention obtained in this manner comprises the (meth)acrylic elastomer and a conductive agent, an excellent effect of forming a conductive film with excellent usability and formability and with excellent flexibility and elongation in a wide range of electrical resistance change ratios is achieved. Therefore, use thereof is expected in a raw material of a conductive film used in, for example, actuators, sensors used in industrial robots or the like, wiring, electrodes, substrates, power generating elements, speakers, microphones, noise cancellers, transducers, artificial muscles, small pumps, medical instrument, and the like.

The conductive film of the invention is characterized in that the (meth)acrylic conductive material is used. Since the conductive film of the invention uses the (meth)acrylic conductive material, the film has excellent flexibility and elongation in a wide range of electrical resistance change ratios.

Examples of method for forming the conductive film of the invention include, but are not limited in the present invention to, a method of applying to a substrate the (meth)acrylic conductive material and drying the material, and the like.

Examples of substrates include, but are not limited in the present invention to, paper that are commonly used such as wood free paper, craft paper, crepe paper, and glassine, substrates consisting of resin such as polyethylene, polypropylene, polyester, polystyrene, polyvinyl chloride, and cellophane, fiber products such as woven fabric, nonwoven fabric, and fabric, and the like.

Examples of methods of applying the (meth)acrylic conductive material to a substrate include, but are not limited in the present invention to, methods that are commonly used such as knife coating, slot die coating, lip coating, roll coating, flow coating, spray coating, bar coating, and dipping. When applying the (meth)acrylic conductive material to a substrate, the (meth)acrylic conductive material can be directly applied to the substrate, or the material can be applied to a release paper or the like and then the coating can be transferred onto the substrate. After applying the (meth)acrylic conductive material in this manner and drying, a conductive film can be formed on a substrate.

The thickness of the (meth)acrylic conductive material applied to a substrate cannot be generalized because the thickness varies depending on the type of the (meth)acrylic elastomer and conductive agent or the like, it is preferable that the thickness is appropriately determined depending on the desired thickness of a conductive film to be formed on a substrate. The thickness of the (meth)acrylic conductive material applied to a substrate is generally about 100 to 1000 μm from the viewpoint of obtaining a conductive film with excellent flexibility and elongation in a wide range of electrical resistance change ratios.

Examples of methods of drying after applying the (meth) acrylic conductive material to a substrate include, but are not limited in the present invention to, irradiation of far infrared rays and hot air.

The shape and size of the conductive film of the invention are not particularly limited, but can be determined to be any value depending on the application of the conductive film. Examples of shapes of a conductive film include, but are not limited in the present invention to, circle, ellipse, triangle, square, rectangle, and the like. An example of the size of a conductive film includes a circular film with a diameter of 1 to 20 mm.

Since the thickness of a conductive film cannot be generalized because the thickness varies depending on the application of the conductive film or the like, it is preferable that the thickness is appropriately determined depending on the application. In general, the thickness is preferably about 1 to 1000 μm, more preferably about 5 to 500 μm, and still more preferably about 10 to 100 μm from the viewpoint of obtaining a conductive film with excellent flexibility and elongation in a wide range of electrical resistance change ratios.

The Young's modulus of the conductive film of the invention is preferably 15 MPa or less, more preferably 10 MPa or less, still more preferably 5 MPa or less, and even more preferably 3 MPa or less from the viewpoint of obtaining a conductive film with excellent flexibility in a wide range of electrical resistance change ratios. In the present invention, the Young's modulus of a conductive film is a value measured based on the methods described in the following Examples.

The elongation of the conductive film of the invention is preferably 500% or greater, more preferably 1000% or greater, still more preferably 1500% or greater, even more preferably 2000% or greater, and even more preferably 4000% or greater from the viewpoint of obtaining a conductive film with excellent elongation in a wide range of electrical resistance change ratios. In the present invention, the elongation of a conductive film is a value measured based on the methods described in the following Examples.

The volume resistivity of the conductive film of the invention can be any value depending on the objective, but is preferably $10^{-5}$ to $10^2$ Ω-cm.

The change in resistance upon 100% elongation of the conductive film of the invention can be any value depending on the objective.

Figure 4:
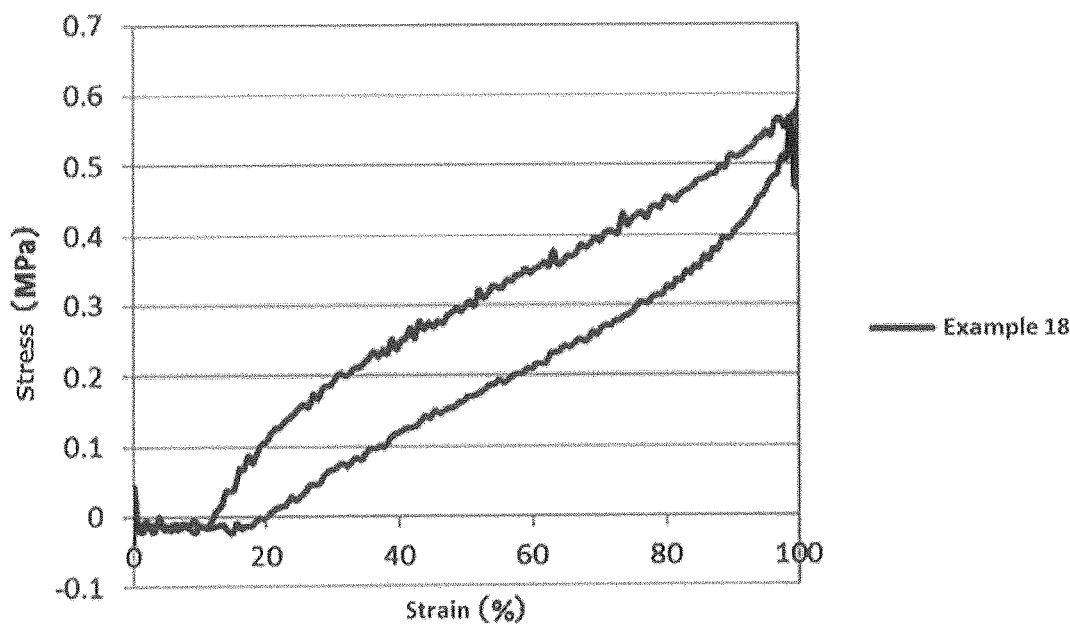
FIG. 4 is a graph showing the relationship between the stress (MPa) and strain (%) of the (meth)acrylic conductive material obtained in Example 18.

The residual strain (hysteresis) of the conductive film of the invention is derived from the area of hysteresis loop obtained by measuring the relationship between stress and strain (FIG. 4). The value of residual strain (hysteresis) can be any value depending on the objective, but is preferably low, preferably 40 MPa·% or less.

Since the conductive film of the invention obtained in this manner uses the (meth)acrylic conductive material, an excellent effect of having excellent flexibility and elongation in a wide range of electrical resistance change ratios is attained.

Therefore, the conductive film of the invention has expectation for use in conductive parts of, for example, actuators, sensors used in industrial robots or the like, wiring, electrodes, substrates, power generating elements, speakers, microphones, noise cancellers, transducers, artificial muscles, small pumps, medical instrument, and the like. In particular, the conductive film of the invention has excellent flexibility and elongation in a wide range of electrical resistance change ratios, so that the film can be suitably used in a conductive part of an actuator with a large displacement.

The actuator of the invention is characterized in that the conductive film is used. Since the actuator of the invention uses the conductive film, an excellent effect of having excellent flexibility and elongation in a wide range of electrical resistance change ratios is manifested.

The actuator of the invention is explained hereinafter with reference to the drawings, but the present invention is not limited only to the embodiments shown in such drawings.

Figure 2:
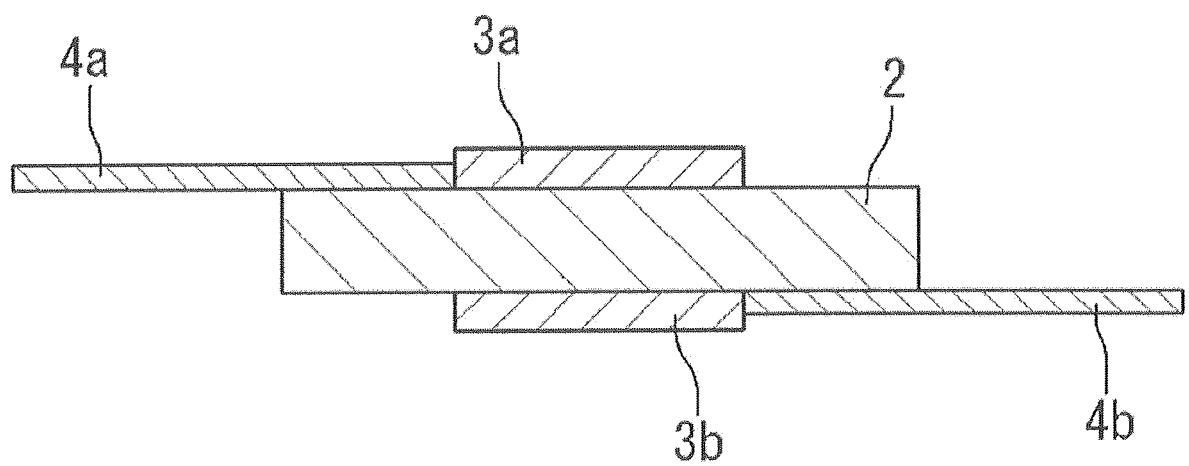
FIG. 2 is a schematic cross-sectional view at section A-A of the actuator depicted in FIG. 1.

FIG. 1 is a schematic plan view depicting an embodiment of an actuator of the invention. FIG. 2 is a schematic cross-sectional view at section A-A of the actuator depicted in FIG. 1.

As shown in FIGS. 1 and 2, an actuator 1 is comprised of a film 2 consisting of a dielectric material and a pair of electrodes 3a and 3b consisting of the conductive film. The film 2 and the electrodes 3a and 3b can be glued together, for example, with conductive paste (not shown). Examples of conductive paste include conductive paste containing a conductive filler such as carbon or silver.

The film 2 is preferably uniaxially or biaxially stretched, preferably biaxially stretched. The factor of stretching of the film 2 is not particularly limited, but is preferably 1,2-fold or greater, more preferably 1.5-fold or greater, and still more preferably 2-fold or greater from the viewpoint of imparting toughness, and is preferably 8-fold or less, more preferably 6-fold or less, and still more preferably 5-fold or less, depending on the thickness of the film, from the viewpoint of preventing rupture upon stretching.

The thickness of the film 2 is preferably 1 to 100 μm, more preferably 1 to 80 μm, still more preferably 1 to 50 μm, and even more preferably 1 to 30 μm from the viewpoint of the actuator 1 exhibiting a large displacement even at a low applied voltage.

The electrodes 3a and 3b are disposed to oppose each other on both sides of the film 2 as shown in FIG. 2. The electrodes 3a and 3b are comprised of the conductive film.

Since the shape, size, and thickness of the electrodes 3a and 3b are not particularly limited, they can be determined to have any value depending on the application of the actuator 1. Examples of the shapes of the electrodes 3a and 3b include, but are not limited in the present invention to, circle, ellipse, triangle, square, rectangle, and the like. An example of the size of the electrodes 3a and 3b includes a circular electrode with a diameter of 1 to 20 mm and the like. The thickness of the electrodes 3a and 3b is not particularly limited. In general, the thickness is preferably about 1 to 1000 μm, more preferably about 5 to 500 μm, and still more preferably about 10 to 100 μm from the viewpoint of obtaining an actuator exhibiting a large displacement.

A terminal 4a is provided on the outer circumferential surface in the direction of the diameter of the electrode 3a, and a terminal 4b is provided on the outer circumferential surface in the direction of the diameter of the electrode 3b. The terminals 4a and 4b are connected to a power source 6 via conducting wires 5a and 5b, respectively.

Application of a voltage to the electrodes 3a and 3b with the power source 6 causes electrostatic attraction between the electrodes 3a and 3b, resulting in contraction of the film 2. Thus, the thickness of the film 2 is reduced, and the film 2 is stretched in the width direction, upon which the electrodes 3a and 3b are also stretched in the width direction with the film 2.

The displacement of the actuator 1 when a voltage is applied to the electrodes 3a and 3b can be measured with a displacement gauge 8 by affixing a marker 7 on the electrode 3a.

The actuator of the invention exhibits a large displacement because the conductive film is used as discussed above.

EXAMPLES

The present invention is explained in further details based on the Examples, but the present invention is not limited to only the Examples.

Manufacturing Example 1

100 g of ethyl acrylate was mixed with 0.062 g of 2,4,6-trimethylbenzoyl diphenylphosphine oxide [BASF, product name: Irgacure TPO] as a polymerization initiator to obtain a monomer component comprising the polymerization initiator.

After injecting the resulting monomer component into a transparent glass mold (length: 100 mm, width: 100 mm, depth: 2 mm), ultraviolet rays were irradiated onto the monomer component so that the amount of irradiation was 0.36 mW/cm$^2$. The monomer component was subjected to bulk polymerization to obtain a (meth)acrylic elastomer.

The resulting (meth)acrylic elastomer was taken out of the mold to make a film consisting of a (meth)acrylic elastomer with a longitudinal length of about 100 mm, transverse length of about 100 mm, and thickness of about 2 mm.

The weight average molecular weight and the number average molecular weight of the resulting film were found, in terms of polystyrene, using gel permeation chromatography [Tosoh Corporation, model number: HLC-8220GPC, column: Tosoh Corporation, model number: TSKgel GMHH-R30, solvent: tetrahydrofuran, flow rate: 0.5 mL/min), and the molecular weight distribution was found. The weight average molecular weight was 2.326 million, the number average molecular weight was 0.649 million, and the molecular weight distribution was 3.6.

A dumbbell No 7 shape specified in 6.1 of JIS K6251 was punched out from the film obtained above to obtain a test fragment. The resulting test fragment was set so that the distance between chucks of a tension tester [A & D Company, Limited, model number: Tensilon RTG-1310] was 17 mm. A tensile load was added at a tensile rate of 50 mm/min until the test fragment ruptured. When the Young's modulus and elongation were measured, the Young's modulus was 0.37 MPa, and the elongation was 5090%.

The elongation of the film obtained above was found based on the equation:

[Elongation of film (%)]=[length of test fragment upon rupture (mm)−original length of test fragment (mm)]/[original length of test fragment (mm)]×100.

Manufacturing Example 2

99.88 g of ethyl acrylate and 0.12 g of 2-hydroxyethyl acrylate were mixed with 0.12 g of 2,4,6-trimethylbenzoyl diphenylphosphine oxide [BASF, product name: Irgacure TPO] as a polymerization initiator to obtain a monomer component comprising the polymerization initiator.

The resulting monomer component was used for preparing a (meth)acrylic elastomer in the same manner as Manufacturing Example 1 to make a film consisting of a (meth)

acrylic elastomer with a longitudinal length of about 100 mm, transverse length of about 100 mm, and thickness of about 2 mm.

The weight average molecular weight and the number average molecular weight of the resulting film were found in the same manner as Manufacturing Example 1, and the molecular weight distribution was found. The weight average molecular weight was 2.033 million, the number average molecular weight was 0.641 million, and the molecular weight distribution was 3.2.

When the Young's modulus and elongation of the film obtained above were measured in the same manner as Manufacturing Example 1, the Young's modulus was 0.54 MPa, and the elongation was 390%.

Manufacturing Example 3

100 g of isoamyl acrylate was mixed with 0.087 g of 2,4,6-trimethylbenzoyl diphenylphosphine oxide [BASF, product name: Irgacure TPO] as a polymerization initiator to obtain a monomer component comprising the polymerization initiator.

The resulting monomer component was used for preparing a (meth)acrylic elastomer in the same manner as Manufacturing Example 1 to make a film consisting of a (meth)acrylic elastomer with a longitudinal length of about 100 mm, transverse length of about 100 mm, and thickness of about 2 mm.

The weight average molecular weight and the number average molecular weight of the film obtained above were found in the same manner as Manufacturing Example 1, and the molecular weight distribution was found. The weight average molecular weight was 3.780 million, the number average molecular weight was 0.341 million, and the molecular weight distribution was 11.1.

When the Young's modulus and elongation of the film obtained above were measured in the same manner as Manufacturing Example 1, the Young's modulus was 0.06 MPa, and the elongation was 1830%.

Manufacturing Example 4

A solution prepared by mixing 100 g of ethyl acrylate and 233 g of toluene was heated to 80° C. 0.50 g of 2,2'-azobisisobutyronitrile (AIBN) [Wako Pure Chemical Industries, Ltd., product name: V-60] was added as a polymerization initiator to the mixture. After maintaining the mixture for 3 hours at 70° C., 1.00 g of 2,2'-azobis(2,4-dimethylvaleronitrile) (ADVN) [Wako Pure Chemical Industries, Ltd., product name: V-65] was further added as a polymerization initiator to the mixture. After solution polymerization by maintaining the mixture for 3 hours at 70° C., the mixture was cooled to room temperature to obtain a resin solution.

After injecting the resulting resin solution into a transparent glass mold (length: 100 mm, width: 100 mm, depth: 2 mm), the solution was dried for 1 hour at 80° C. with a hot plate to obtain a (meth)acrylic elastomer.

The resulting (meth)acrylic elastomer was taken out of the mold to make a film consisting of a (meth)acrylic elastomer with a longitudinal length of about 100 mm, transverse length of about 100 mm, and thickness of about 0.6 mm.

The weight average molecular weight and the number average molecular weight of the resulting film were found, in terms of polystyrene, using gel permeation chromatography [Tosoh Corporation, model number: HLC-8220GPC, column: Tosoh Corporation, model number: TSKgel G-5000HXL and TSKgel G-3000 were used in series, solvent: tetrahydrofuran, flow rate: 1.0 mL/min), and the molecular weight distribution was found. The weight average molecular weight was 117 thousand, the number average molecular weight was 33 thousand, and the molecular weight distribution was 3.5.

Since the resulting film was highly tacky (sticky), the Young's modulus and elongation could not be measured.

Manufacturing Example 5

A solution prepared by mixing 100 g of (2-methyl-2-ethyl-1,3-dioxolan-4-yl)methyl acrylate [Osaka Organic Chemical Industry Ltd., product name: MEDOL-10] and 100 g of ethyl acetate was heated to 70° C. 0.50 g of 2,2'-azobisisobutyronitrile (AIBN) [Wako Pure Chemical Industries, Ltd., product name: V-60] was added to the mixture as a polymerization initiator. After maintaining the mixture for 3 hours at 70° C., 1.00 g of 2,2'-azobis(2,4-dimethylvaleronitrile) (ADVN) [Wako Pure Chemical Industries, Ltd., product name: V-65] was further added to the mixture as a polymerization initiator. After solution polymerization by maintaining the mixture for 3 hours at 70° C., the mixture was cooled to room temperature to obtain a resin solution.

The resulting resin solution was used for preparing a (meth)acrylic elastomer in the same manner as Manufacturing Example 4 to make a film consisting of a (meth)acrylic elastomer with a longitudinal length of about 100 mm, transverse length of about 100 mm, and thickness of about 1 mm.

The weight average molecular weight and the number average molecular weight of the film obtained above were found in the same manner as Manufacturing Example 4, and the molecular weight distribution was found. The weight average molecular weight was 387 thousand, the number average molecular weight was 54 thousand, and the molecular weight distribution was 7.2.

When the Young's modulus and elongation of the film obtained above were measured in the same manner as Manufacturing Example 1, the Young's modulus was 0.03 MPa, and the elongation was 1570%.

Manufacturing Example 6

A solution prepared by mixing 100 g of ethyl acrylate, 2000 g of ion exchange water, and 1.00 g of polyoxyethylene alkyl propenyl phenyl ether [DKS Co. Ltd., product name: Aquaron RN-20] as a reactive emulsifier was heated to 70° C. 1.00 g of potassium persulfate (KPS) was added to the mixture as a polymerization initiator. After emulsion polymerization of the mixture by maintaining the mixture for 6 hours at 70° C., the mixture was cooled to room temperature to obtain a resin dispersion.

The resulting resin dispersion was salted out with tetrahydrofuran and decanted, and then vacuum dried to obtain a polymer. An attempt was made to dissolve 100 g of the resulting polymer in 900 g of toluene, but the polymer could not be completely dissolved.

Manufacturing Example 7

The resin dispersion obtained in Manufacturing Example 6 was salted out with tetrahydrofuran and decanted, and then vacuum dried to obtain a polymer. 100 g of the resulting polymer was dissolved in 900 g of methyl ethyl ketone to obtain a resin solution.

After injecting the resulting resin solution into a transparent glass mold (length: 100 mm, width: 100 mm, depth: 2 mm), the solution was dried for 1 hour at 50° C. with a hot plate to obtain a (meth)acrylic elastomer.

The resulting (meth)acrylic elastomer was taken out of the mold to make a film consisting of a (meth)acrylic elastomer with a longitudinal length of about 100 mm, transverse length of about 100 mm, and thickness of about 0.2 mm.

The weight average molecular weight and the number average molecular weight of the resulting film were found in the same manner as Manufacturing Example 1, and the molecular weight distribution was found. The weight average molecular weight was 1.253 million, the number average molecular weight was 0.213 million, and the molecular weight distribution was 5.8.

When the Young's modulus and elongation of the film obtained above were measured in the same manner as Manufacturing Example 1, the Young's modulus was 0.30 MPa, and the elongation was 4000%.

Manufacturing Example 8

99.93 g of ethyl acrylate and 0.072 g of acrylic acid were mixed with 0.12 g of 2,4,6-trimethylbenzoyl diphenylphosphine oxide [BASF, product name: Irgacure TPO] as a polymerization initiator to obtain a monomer component comprising the polymerization initiator.

The resulting monomer component was used for preparing a (meth)acrylic elastomer in the same manner as Manufacturing Example 1 to make a film consisting of a (meth)acrylic elastomer with a longitudinal length of about 100 mm, transverse length of about 100 mm, and thickness of about 2 mm.

The weight average molecular weight and the number average molecular weight of the film obtained above were found in the same manner as Manufacturing Example 1, and the molecular weight distribution was found. The weight average molecular weight was 1.718 million, the number average molecular weight was 0.681 million, and the molecular weight distribution was 2.5.

When the Young's modulus and elongation of the film obtained above were measured in the same manner as Manufacturing Example 1, the Young's modulus was 0.18 MPa, and the elongation was 5000%.

Example 1

100 g of (meth)acrylic elastomer obtained in Manufacturing Example 1 was dissolved into 900 g of toluene to obtain a resin solution.

A short multi-wall carbon nanotube [KNC Laboratories Co., Ltd., toluene dispersion with 2.4% by mass of non-volatile portion, length: 1 to 9 μm, the same applies hereinafter] was added to the resulting resin solution as a conductive agent so that the percentage of conductive agent solid content among all solid portions of the (meth)acrylic elastomer and the conductive agent would be 3.8% by mass, and a dispersant [Elementis, product number: NUOSPERSE® AP657] was added to the resin solution at an amount of 2% by mass of solid of the conductive agent and mixed to obtain a (meth)acrylic conductive material.

Next, usability and formability were studied as the physical properties of the (meth)acrylic conductive material based on the following method. The results are shown in Table 1.
[Usability]
When preparing the (meth)acrylic elastomer, it was studied whether a drying process to remove a solvent, which is a complex process, was required, and this was evaluated based on the following evaluation criteria.
(Evaluation Criteria)
○: Drying process is not required
x: Drying process is required Example 1 did not require a drying process, thus having excellent usability.
[Formability]
A (meth)acrylic conductive material was applied on a glass sheet with an applicator at room temperature so that the thickness would be about 600 μm. The material was heated for 1 hour at 80° C. with a hot plate and studied as to whether a film is formed. This was evaluated based on the following evaluation criteria.
(Evaluation Criteria)
○: Film can be formed
x: Film cannot be formed Next, the (meth)acrylic conductive material obtained above was applied to a releasable polyester film with an applicator at room temperature so that the thickness after drying would be 30 μm. The material was heated for 1 hour at a temperature of 80° C. with a hot plate to make a conductive film.

Flexibility and elongation were studied as the physical properties of the resulting conductive film based on the following method. The results are shown in Table 1.
[Flexibility]
The Young's modulus (MPa) of the conductive film was measured in the same manner as Manufacturing Example 1. The flexibility was evaluated based on the following evaluation criteria.
(Evaluation Criteria)
◎: Young's modulus is less than 3 MPa
○: Young's modulus is 3 MPa or greater and less than 10 MPa
Δ: Young's modulus is 10 MPa or greater and less than 15 MPa
x: Young's modulus is 15 MPa or greater
[Elongation]
The elongation (%) of the conductive film was measured in the same manner as Manufacturing Example 1. The elongation was evaluated based on the following evaluation criteria.
(Evaluation Criteria)
◎: elongation is 2000% or greater
○: elongation is 1000% or greater and less than 2000%
Δ: elongation is 500% or greater and less than 1000%
x: elongation is less than 500%

The electrical resistance of the conductive film obtained above was measured using a digital multimeter [Sanwa Electric Instrument Co., Ltd., model number: MP-3](initial electrical resistance). The electrical resistance of the conductive film when elongated so that the elongation of the conductive film would be 100% was measured in the same manner (electrical resistance when elongated). From these measurement results, the electrical resistance change ratio of the conductive film was found based on the equation:

[Electrical resistance change ratio of conductive film (fold)]=[electrical resistance when elongated (Ω)]/[initial electrical resistance (Ω)].

As a result, the electrical resistance change ratio of the conductive film was 8.3 fold.

The conductive film obtained above was cut out into a rectangular shape of about 5 mm in length and about 20 mm in width to make a test fragment. When a surface resistance measuring instrument [Mitsubishi Chemical Corporation, model number: Loresta-AP MCP-T400, probe: ASP probe (four needle probe)] was used to measure the volume resistivity (%) of the test fragment obtained above in accordance with JIS K7194 in an atmosphere with a temperature of 23±5° C. and relative humidity of 50±10% by a four point probe method, the volume resistivity of the test fragment was 19.1 Ω-cm. When the relationship between stress and strain was measured to find the residual strain (hysteresis), it was 21.5 MPa·%.

Example 2

100 g of the (meth)acrylic elastomer obtained in Manufacturing Example 1 was dissolved in 900 g of toluene to obtain a resin solution.

A normal multi-wall carbon nanotube [KNC Laboratories Co., Ltd., toluene dispersion with 2.4% by mass of non-volatile portion, length: 10 to 90 μm, the same applies hereinafter] was added to the resulting resin solution as a conductive agent so that the percentage of conductive agent solid content among all solid portions of the (meth)acrylic elastomer and the conductive agent would be 9.2% by mass, and a dispersant [Elementis, product number: NUOSPERSE® AP657] was added to the resin solution at an amount of 2% by mass of solid of the conductive agent and mixed to obtain a (meth)acrylic conductive material.

Usability and formability were studied as physical properties of the (meth)acrylic conductive material obtained above in the same manner as Example 1. A drying process was not required such that usability was excellent. The results for formability are shown in Table 1.

Next, the (meth)acrylic conductive material obtained above was used to make a conductive film in the same manner as Example 1. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 3.8 fold, and the volume resistivity was 34.8 Ω-cm. When the relationship between stress and strain was measured to study the residual strain (hysteresis), it was 12.4 MPa·%.

Example 3

100 g of the (meth)acrylic elastomer obtained in Manufacturing Example 1 was dissolved in 900 g of toluene to obtain a resin solution.

A long multi-wall carbon nanotube [KNC Laboratories Co., Ltd., toluene dispersion with 1.6% by mass of non-volatile portion, length: 100 to 900 μm, the same applies hereinafter] was added to the resulting resin solution as a conductive agent so that the percentage of conductive agent solid content among all solid portions of the (meth)acrylic elastomer and the conductive agent would be 2.5% by mass, and a dispersant [Elementis, product number: NUOSPERSE® AP657] was added to the resin solution at an amount of 2% by mass of solid of the conductive agent and mixed to obtain a (meth)acrylic conductive material.

Usability and formability were studied as physical properties of the (meth)acrylic conductive material obtained above in the same manner as Example 1. A drying process was not required such that usability was excellent. The results for formability are shown in Table 1. Next, the (meth)acrylic conductive material obtained above was used to make a conductive film in the same manner as Example 1. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 6.7 fold, and the volume resistivity was 10.3 Ω-cm. When the relationship between stress and strain was measured to study the residual strain (hysteresis), it was 21.3 MPa·%.

Example 4

100 g of the (meth)acrylic elastomer obtained in Manufacturing Example 1 was dissolved in 900 g of toluene to obtain a resin solution.

A single wall carbon nanotube [KNC Laboratories Co., Ltd., toluene dispersion with 1.96% by mass of non-volatile portion, length: 1 to 9 μm, the same applies hereinafter] was added to the resulting resin solution as a conductive agent so that the percentage of conductive agent solid content among all solid portions of the (meth)acrylic elastomer and the conductive agent would be 3% by mass, and a dispersant [Elementis, product number: NUOSPERSE® AP657] was added to the resin solution at an amount of 2% by mass of solid of the conductive agent and mixed to obtain a (meth)acrylic conductive material.

Usability and formability were studied as physical properties of the (meth)acrylic conductive material obtained above in the same manner as Example 1. A drying process was not required such that usability was excellent. The results for formability are shown in Table 1.

Next, the (meth)acrylic conductive material obtained above was used to make a conductive film in the same manner as Example 1. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 5.0 fold, and the volume resistivity was 24.2 Ω-cm. When the relationship between stress and strain was measured to study the residual strain (hysteresis), it was 12.8 MPa·%.

Example 5

100 g of the (meth)acrylic elastomer obtained in Manufacturing Example 1 was dissolved in 900 g of toluene to obtain a resin solution.

A super growth carbon nanotube [KNC Laboratories Co., Ltd., toluene dispersion with 1.96% by mass of non-volatile portion, length: 100 to 900 μm, the same applies hereinafter] was added to the resulting resin solution as a conductive agent so that the percentage of conductive agent solid content among all solid portions of the (meth)acrylic elastomer and the conductive agent would be 3% by mass, and a dispersant [Elementis, product number: NUOSPERSE® AP657] was added to the resin solution at an amount of 2% by mass of solid of the conductive agent and mixed to obtain a (meth)acrylic conductive material.

Usability and formability were studied as physical properties of the (meth)acrylic conductive material obtained above in the same manner as Example 1. A drying process was not required such that usability was excellent. The results for formability are shown in Table 1.

Next, the (meth)acrylic conductive material obtained above was used to make a conductive film in the same manner as Example 1. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 135.2 fold, and the volume resistivity was 10.2 Ω·cm. When the relationship between stress and strain was measured to study the residual strain (hysteresis), it was 9.6 MPa·%.

Example 6

100 g of the (meth)acrylic elastomer obtained in Manufacturing Example 1 was dissolved in 900 g of toluene to obtain a resin solution.

Carbon black [Lion Specialty Chemicals Co., Ltd., product number: FD-7062G, N-methyl-2-pyrrolidone dispersion with 9% by mass of non-volatile portion, mean particle size: 5 μm or less, the same applies hereinafter] was added to the resulting resin solution as a conductive agent so that the percentage of conductive agent solid content among all solid portions of the (meth)acrylic elastomer and the conductive agent would be 10% by mass, and mixed to obtain a (meth)acrylic conductive material.

Usability was studied as a physical property of the (meth) acrylic conductive material obtained above in the same manner as Example 1. Formability was studied in the same manner as Example 1, other than heating for 2 hours at a temperature of 180° C. A drying process was not required such that usability was excellent. The results for formability are shown in Table 1.

Next, the (meth)acrylic conductive material obtained above was used to make a conductive film in the same manner as Example 1, other than heating for 2 hours at a temperature of 180° C. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 77.8 fold, and the volume resistivity was 2249 Ω·cm. When the relationship between stress and strain was measured to study the residual strain (hysteresis), it was 6.0 MPa·%.

Example 7

A (meth)acrylic conductive material was obtained in the same manner as Example 6, other than changing the conductive agent solid content to 16% by mass instead of 10% by mass in Example 6.

Usability and formability were studied as physical properties of the (meth)acrylic conductive material obtained above in the same manner as Example 6. A drying process was not required such that usability was excellent. The results for formability are shown in Table 1.

Next, the (meth)acrylic conductive material obtained above was used to make a conductive film in the same manner as Example 6. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 9.4 fold, and the volume resistivity was 44.2 Ω·cm. When the relationship between stress and strain was measured to study the residual strain (hysteresis), it was 16.0 MPa·%.

Example 8

A (meth)acrylic conductive material was obtained in the same manner as Example 6, other than changing the conductive agent solid content to 23% by mass instead of 10% by mass in Example 6.

Usability and formability were studied as physical properties of the (meth)acrylic conductive material obtained above in the same manner as Example 6. A drying process was not required such that usability was excellent. The results for formability are shown in Table 1.

Next, the (meth)acrylic conductive material obtained above was used to make a conductive film in the same manner as Example 6. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 18.7 fold, and the volume resistivity was 11.2 Ω·cm. When the relationship between stress and strain was measured to study the residual strain (hysteresis), it was 25.5 MPa·%.

Example 9

100 g of the (meth)acrylic elastomer obtained in Manufacturing Example 1 was dissolved in 900 g of toluene to obtain a resin solution.

Graphene [Aitec, product name: iGurafen, toluene dispersion with 5% by mass of non-volatile portion, mean particle size: 5 to 10 μm, thickness: about 10 nm, the same applies hereinafter] was added to the resulting resin solution as a conductive agent so that the percentage of conductive agent solid content among all solid portions of the (meth) acrylic elastomer and the conductive agent would be 16% by mass, and mixed to obtain a (meth)acrylic conductive material.

Usability was studied as a physical property of the (meth) acrylic conductive material obtained above in the same manner as Example 1. Formability was studied in the same manner as Example 1, other than heating for 1 hour at a temperature of 50° C. A drying process. was not required such that usability was excellent. The results for formability are shown in Table 1.

Next, the (meth)acrylic conductive material obtained above was used to make a conductive film in the same manner as Example 1, other than heating for 1 hour at a temperature of 50° C. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 311.7 fold, and the volume resistivity was 119800 Ω·cm.

Example 10

A (meth)acrylic conductive material was obtained in the same manner as Example 9, other than changing the conductive agent solid content to 23% by mass instead of 16% by mass in Example 9.

Usability and formability were studied as physical properties of the (meth)acrylic conductive material obtained above in the same manner as Example 9. A drying process was not required such that usability was excellent. The results for formability are shown in Table 1.

Next, the (meth)acrylic conductive material obtained above was used to make a conductive film in the same manner as Example 9. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 6094 fold, and the volume resistivity was 20 Ω-cm. When the relationship between stress and strain was measured to study the residual strain (hysteresis), it was 36.5 MPa·%.

Example 11

A (meth)acrylic conductive material was obtained in the same manner as Example 9, other than changing the conductive agent solid content to 27% by mass instead of 16% by mass in Example 9.

Usability and formability were studied as physical properties of the (meth)acrylic conductive material obtained above in the same manner as Example 9. A drying process was not required such that usability was excellent. The results for formability are shown in Table 1.

Next, the (meth)acrylic conductive material obtained above was used to make a conductive film in the same manner as Example 9. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 476 fold, and the volume resistivity was 4.2 Ω-cm.

Example 12

100 g of the (meth)acrylic elastomer obtained in Manufacturing Example 1 was dissolved in 900 g of toluene to obtain a resin solution.

Flake silver powder [Fukuda Metal Foil & Powder Co. Ltd., product name: AgC-A, mean particle size: 3 to 5 μm, the same applies hereinafter] was added to the resulting resin solution as a conductive agent so that the percentage of conductive agent solid content among all solid portions of the (meth)acrylic elastomer and the conductive agent would be 70% by mass, and 2-(2-butoxyethanol) [Tokyo Chemical Industry Co., Ltd.] was added to the resin solution as a dispersant at an amount of 1.6% by mass of all solid portions of a (meth)acrylic elastomer and the conductive agent, and mixed to obtain a (meth)acrylic conductive material.

Usability was studied as a physical property of the (meth)acrylic conductive material obtained above in the same manner as Example 1. Formability was studied in the same manner as Example 1, other than heating for 1 hour at a temperature of 180° C. A drying process was not required such that usability was excellent. The results for formability are shown in Table 1.

Next, the (meth)acrylic conductive material obtained above was used to make a conductive film in the same manner as Example 1, other than heating for 1 hour at a temperature of 180° C. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was over the measurement limit (10 million fold), and the volume resistivity was 109000 Ω-cm.

Example 13

A (meth)acrylic conductive material was obtained in the same manner as Example 12, other than changing the conductive agent solid content to 80% by mass instead of 70% by mass in Example 12.

Usability and formability were studied as physical properties of the (meth)acrylic conductive material obtained above in the same manner as Example 12. A drying process was not required such that usability was excellent. The results for formability are shown in Table 1.

Next, the (meth)acrylic conductive material obtained above was used to make a conductive film in the same manner as Example 12. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 20.6 fold, and the volume resistivity was 0.006 Ω-cm. When the relationship between stress and strain was measured to study the residual strain (hysteresis), it was 30.7 MPa·%.

Example 14

A (meth)acrylic conductive material was obtained in the same manner as Example 12, other than changing the conductive agent solid content to 85% by mass instead of 70% by mass in Example 12.

Usability and formability were studied as physical properties of the (meth)acrylic conductive material obtained above in the same manner as Example 12. A drying process was not required such that usability was excellent. The results for formability are shown in Table 1.

Next, the (meth)acrylic conductive material obtained above was used to make a conductive film in the same manner as Example 12. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 207 fold, and the volume resistivity was 0.005 Ω-cm.

Example 15

100 g of the (meth)acrylic elastomer obtained in Manufacturing Example 2 was dissolved in 900 g of toluene to obtain a resin solution. 0.23 g of isophorone diisocyanate and 0.02 g of tin catalyst [Nitto Kasei Co., Ltd., product name: Neostann U-100] were added to the resulting resin solution and stirred thoroughly.

Flake silver powder [Fukuda Metal Foil & Powder Co. Ltd., product name: AgC-A] was added to the resin solution obtained above as a conductive agent so that the percentage of conductive agent solid content among all solid portions of the (meth)acrylic elastomer and the conductive agent would be 80% by mass, and 2-(2-butoxyethanol) [Tokyo Chemical Industry Co., Ltd.] was added to the resin solution as a dispersant at an amount of 1.6% by mass of all solids of the (meth)acrylic elastomer and the conductive agent, and mixed to obtain a (meth)acrylic conductive material.

Usability was studied as a physical property of the (meth)acrylic conductive material obtained above in the same manner as Example 1. Formability was studied in the same manner as Example 1, other than heating for 1 hour at a temperature of 180° C. A drying process was not required such that usability was excellent. The results for formability are shown in Table 1.

Next, the (meth)acrylic conductive material obtained above was used to make a conductive film in the same manner as Example 1, other than heating for 1 hour at a temperature of 180° C. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was over the measurement limit (10 million fold), and the volume resistivity was 197800 Ω-cm. When solvent resistance was studied, the film did not re-dissolve into a solvent, revealing that the film has excellent solvent resistance.

Example 16

A (meth)acrylic conductive material was obtained in the same manner as Example 15, other than changing the conductive agent solid content to 85% by mass instead of 80% by mass in Example 15.

Usability and formability were studied as physical properties of the (meth)acrylic conductive material obtained above in the same manner as Example 15. A drying process was not required such that usability was excellent. The results for formability are shown in Table 1.

Next, the (meth)acrylic conductive material obtained above was used to make a conductive film in the same manner as Example 15. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 207 fold, and the volume resistivity was 0.1 Ω-cm. When the relationship between stress and strain was measured to study the residual strain (hysteresis), it was 7.1 MPa·%. When solvent resistance was studied, the film did not re-dissolve into a solvent, revealing that the film has excellent solvent resistance.

Example 17

100 g of the (meth)acrylic elastomer obtained in Manufacturing Example 8 was dissolved in 900 g of toluene to obtain a resin solution.

Flake silver powder [Fukuda Metal Foil & Powder Co. Ltd., product name: AgC-A] was added to the resulting resin solution as a conductive agent so that the percentage of conductive agent solid content among all solid portions of the (meth)acrylic elastomer and the conductive agent would be 80% by mass, and 2-(2-butoxyethanol) [Tokyo Chemical Industry Co., Ltd.] was added to the resin solution as a dispersant at an amount of 1.6% by mass of all solids of a (meth)acrylic elastomer and the conductive agent, and mixed to obtain a (meth)acrylic conductive material.

Formability was studied as a physical property of the resulting (meth)acrylic conductive material in the same manner as Example 1, other than heating for 1 hour at a temperature of 180° C. A drying process was not required such that usability was excellent. The results for formability are shown in Table 1. When a film can be formed, the Young's modulus was 8.53 MPa, the elongation was 5000%, the electrical resistance change ratio was 3.5 fold, and the volume resistivity was 0.00009 Ω-cm. When the relationship between stress and strain was measured to study residual strain (hysteresis was studied, it was 14.1 MPa·%.

Example 18

100 g of the (meth)acrylic elastomer obtained in Manufacturing Example 2 was dissolved in 900 g of toluene to obtain a resin solution. 0.23 g of isophorone diisocyanate and 0.02 g of tin catalyst [Nitto Kasei Co., Ltd., product name: Neostann U-100] were added to the resulting resin solution and stirred thoroughly.

A normal multi-wall carbon nanotube [KNC Laboratories Co., Ltd.] was added to the resulting resin solution as a conductive agent so that the percentage of conductive agent solid content among all solid portions of the (meth)acrylic elastomer and the conductive agent would be 9.0% by mass, and a dispersant [Elementis, product number: NUOSPERSE® AP657] was added to the resin solution at an amount of 2% by mass of solid of the conductive agent and mixed to obtain a (meth)acrylic conductive material.

Usability was studied as a physical property of the (meth)acrylic conductive material obtained above in the same manner as Example 1. Formability was studied in the same manner as Example 1, other than heating for 1 hour at 50° C., and then for 1 hour at a temperature of 180° C. A drying process was not required such that usability was excellent. The results for formability are shown in Table 1. When a film can be formed, the Young's modulus was 3.45 MPa, the elongation was 620%, the electrical resistance change ratio was 13.5 fold, and the volume resistivity was 5.3 Ω-cm. When the relationship between stress and strain was measure to study residual strain (hysteresis), it was 10.3 MPa·%. When solvent resistance was studied, the material did not re-dissolve into a solvent, revealing that the material has excellent solvent resistance.

Figure 5:
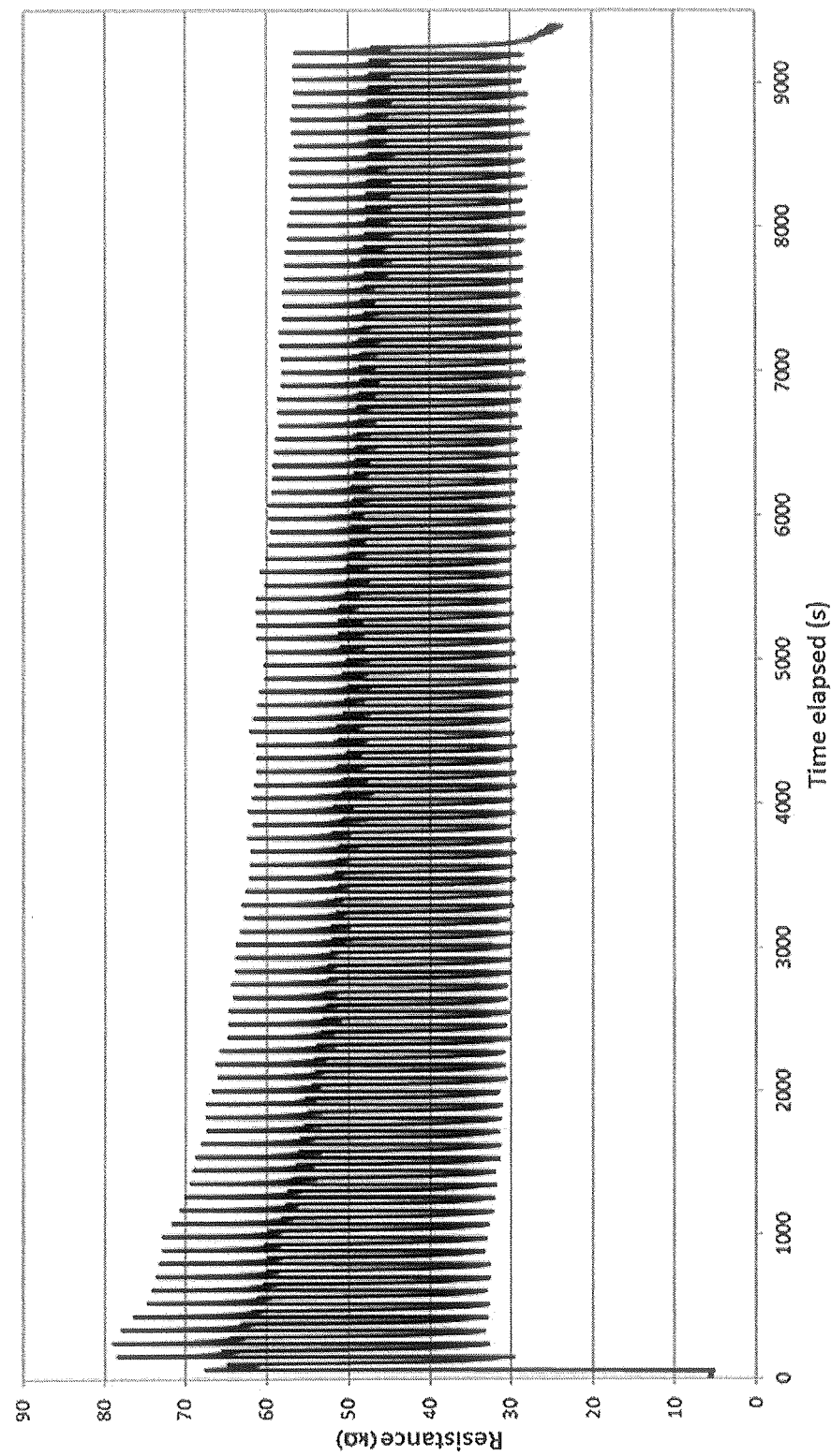
FIG. 5 is a graph showing test results indicating the durability of the (meth)acrylic conductive material obtained in Example 18.

The durability of the (meth)acrylic conductive material in Example 18 was studied. A sample with a sample size of 5 mm×20 mm was made. A cycle of elongating the sample to 100% at a rate of 1 mm/s and holding the sample for 30 s, and then offloading the load at a rate of 1 mm/s and holding the sample for 30 s was repeated 100 times. The resistance was measured during the cycle. The results are shown in FIG. 5. As shown in FIG. 5, variation in resistance due to elongation and offloading during the 100 cycles was nearly constant, revealing that the material has durability.

Example 19

Flake silver powder [Fukuda Metal Foil & Powder Co. Ltd., product name: AgC-A] was added to the resin solution obtained in Manufacturing Example 7 as a conductive agent so that the percentage of conductive agent solid content among all solid portions of a (meth)acrylic elastomer and the conductive agent would be 80% by mass, and 2-(2-butoxyethanol) [Tokyo Chemical Industry Co., Ltd.] was added to the resin solution as a dispersant at an amount of 1.6% by mass of all solids of the (meth)acrylic elastomer and the conductive agent, and mixed to obtain a (meth)acrylic conductive material.

Formability was studied as a physical property of the resulting (meth)acrylic conductive material in the same manner as Example 1, other than heating for 1 hour at a temperature of 180° C. The results thereof are shown in Table 1.

Next, the (meth)acrylic conductive material obtained above was used to make a conductive film in the same manner as Example 1, other than heating for 1 hour at a temperature of 180° C. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was 1.16 million fold, and the volume resistivity was 0.01 Ω-cm. When the relationship between stress and strain was measured to study the residual strain (hysteresis), it was 6.6 MPa·%.

Example 20

A (meth)acrylic conductive material was obtained in the same manner as Example 19, other than changing the conductive agent solid content to 90% by mass instead of 80% by mass in Example 19.

Formability was studied as a physical property of the (meth)acrylic conductive material obtained above in the same manner as Example 19. The results are shown in Table 1.

Next, the (meth)acrylic conductive material obtained above was used to make a conductive film in the same manner as Example 19. Flexibility and elongation were studied as physical properties of the resulting conductive film in the same manner as Example 1. The results are shown in Table 1. When the electrical resistance change ratio and the volume resistivity of the conductive film were measured in the same manner as Example 1, the electrical resistance change ratio was over the measurement limit (10 million fold), and the volume resistivity was 0.0003 Ω-cm. When the relationship between stress and strain was measured to study the residual strain (hysteresis), it was 11.8 MPa·%.

Comparative Example 1

100 g of the (meth)acrylic elastomer obtained in Manufacturing Example 3 was dissolved in 900 g of toluene to obtain a resin solution.

Flake silver powder [Fukuda Metal Foil & Powder Co. Ltd., product name: AgC-A] was added to the resulting resin solution as a conductive agent so that the percentage of conductive agent solid content among all solid portions of the (meth)acrylic elastomer and the conductive agent would be 90% by mass, and 2-(2-butoxyethanol) [Tokyo Chemical Industry Co., Ltd.] was added to the resin solution as a dispersant at an amount of 1.6% by mass of all solids of the (meth)acrylic elastomer and the conductive agent, and mixed to obtain a (meth)acrylic conductive material.

Usability was studied as a physical property of the (meth)acrylic conductive material obtained above in the same manner as Example 1. Formability was studied in the same manner as Example 1, other than heating for 1 hour at a temperature of 180° C. A drying process was not required. The results for formability are shown in Table 1.

Comparative Example 2

100 g of the (meth)acrylic elastomer obtained in Manufacturing Example 3 was dissolved in 900 g of toluene to obtain a resin solution.

A normal multi-wall carbon nanotube [KNC Laboratories Co., Ltd.] was added to the resulting resin solution as a conductive agent so that the percentage of conductive agent solid content among all solid portions of the (meth)acrylic elastomer and the conductive agent would be 13.6% by mass, and a dispersant [Elementis, product number: NUOSPERSE® AP657] was added to the resin solution at an amount of 2% by mass of solid of the conductive agent and mixed to obtain a (meth)acrylic conductive material.

However, the conductive agent separated or precipitated in the resin solution and failed to disperse in the (meth)acrylic conductive material obtained above. Usability was studied as a physical property of the (meth)acrylic conductive material in the same manner as Example 1. Formability was studied in the same manner as Example 1, other than heating for 1 hour at a temperature of 50° C. A drying process was not required. The results for formability are shown in Table 1.

Comparative Example 3

A normal multi-wall carbon nanotube [KNC Laboratories Co., Ltd.] was added to the resin solution obtained in Manufacturing Example 4 as a conductive agent so that the percentage of conductive agent solid content among all solid portions of the (meth)acrylic elastomer and the conductive agent would be 9.8% by mass, and a dispersant [Elementis, product number: NUOSPERSE® AP657] was added to the resin solution at an amount of 2% by mass of solid of the conductive agent and mixed to obtain a (meth)acrylic conductive material.

However, the conductive agent separated or precipitated in the resin solution and failed to disperse in the (meth)acrylic conductive material obtained above. Usability was studied as a physical property of the (meth)acrylic conductive material in the same manner as Example 1. Formability was studied in the same manner as Example 1, other than heating for 1 hour at a temperature of 50° C. A drying process was not required. The results for formability are shown in Table 1.

Comparative Example 4

A normal multi-wall carbon nanotube [KNC Laboratories Co., Ltd.] was added to the resin solution obtained in Manufacturing Example 5 as a conductive agent so that the percentage of conductive agent solid content among all solid portions of a (meth)acrylic elastomer and the conductive agent would be 10.4% by mass, and a dispersant [Elementis, product number: NUOSPERSE® AP657] was added to the resin solution at an amount of 2% by mass of solid of the conductive agent and mixed to obtain a (meth)acrylic conductive material.

However, the conductive agent separated or precipitated in the resin solution and failed to disperse in the (meth)acrylic conductive material obtained above. Usability was studied as a physical property of the (meth)acrylic conductive material in the same manner as Example 1. Formability was studied in the same manner as Example 1, other than heating for 1 hour at a temperature of 50° C. A drying process was not required. The results for formability are shown in Table 1.

Comparative Example 5

A normal multi-wall carbon nanotube [KNC Laboratories Co., Ltd.] was added to the resin solution obtained in Manufacturing Example 6 as a conductive agent so that the percentage of conductive agent solid content among all solid portions of a (meth)acrylic elastomer and the conductive agent would be 9.2% by mass, and a dispersant [Elementis, product number: NUOSPERSE® AP657] was added to the resin solution at an amount of 2% by mass of solid of the conductive agent and mixed to obtain a (meth)acrylic conductive material.

Usability and formability were studied as physical properties of the (meth)acrylic conductive material obtained above in the same manner as Example 1. A drying process was not required. The results for formability are shown in Table 1.

After injecting the resulting (meth)acrylic conductive material into a transparent glass mold (length: 100 mm, width: 100 mm, depth: 2 mm), the material was heated for 1 hour at 80° C. with a hot plate to obtain a conductive film. Flexibility and elongation were studied as physical properties of the resulting conductive film in the same manner as Example 1. The results thereof are shown in Table 1. When the electrical resistance change ratio and the volume resistivity of the conductive film were measured in the same manner as Example 1, the electrical resistance change ratio was 10.2 fold, and the volume resistivity was 25.3 Ω-cm. When the relationship between stress and strain was measured to study the residual strain (hysteresis), it was 22.0 MPa·%.

TABLE 1

| Example/Comparative Example number | Physical property of (meth)acrylic conductive material Formability | Physical property of conductive film Flexibility | Physical property of conductive film Elongation |
|---|---|---|---|
| Example | | | |
| 1 | ○ | ◎ | ◎ |
| 2 | ○ | ◎ | ◎ |
| 3 | ○ | ◎ | ◎ |
| 4 | ○ | ◎ | ◎ |
| 5 | ○ | ◎ | ◎ |
| 6 | ○ | ◎ | ◎ |
| 7 | ○ | ◎ | ◎ |
| 8 | ○ | Δ | ◎ |
| 9 | ○ | ○ | ◎ |
| 10 | ○ | ○ | ◎ |
| 11 | ○ | ○ | ○ |
| 12 | ○ | ◎ | ◎ |
| 13 | ○ | ○ | ◎ |
| 14 | ○ | Δ | ◎ |
| 15 | ○ | ◎ | ◎ |
| 16 | ○ | ○ | ◎ |
| 17 | ○ | ○ | ◎ |
| 18 | ○ | ○ | Δ |
| 19 | ○ | ◎ | Δ |
| 20 | ○ | ◎ | ○ |
| Comparative Example | | | |
| 1 | X | — | — |
| 2 | X | — | — |
| 3 | X | — | — |
| 4 | X | — | — |
| 5 | ○ | Δ | X |

(Note)
—: Since a film cannot be formed, flexibility and elongation cannot be evaluated In view of the results shown in Table 1, each Example has no evaluation of x. It can be understood that each Example is comprehensively better than each Comparative Example in terms of formability, flexibility, and elongation.

Further, it can be understood from the results of Examples 1 to 20 that the conductive films obtained in the Examples are better in terms of flexibility and elongation in a wide range of electrical resistance change ratios.

Example 21

An acrylic foam structural bonding tape (3M Japan Limited, product number: VHB4910, material thickness: 1 mm] was used as a film. The film was biaxially stretched to a factor of 6 times in both the longitudinal and transverse directions. The film was fixed to a mold while being stretched.

Next, the conductive film obtained in Example 1 was applied to the center portion on both sides of the film to form an electrode (diameter: 9 mm, thickness: 20 to 50 μm), resulting in an actuator.

Figure 3:
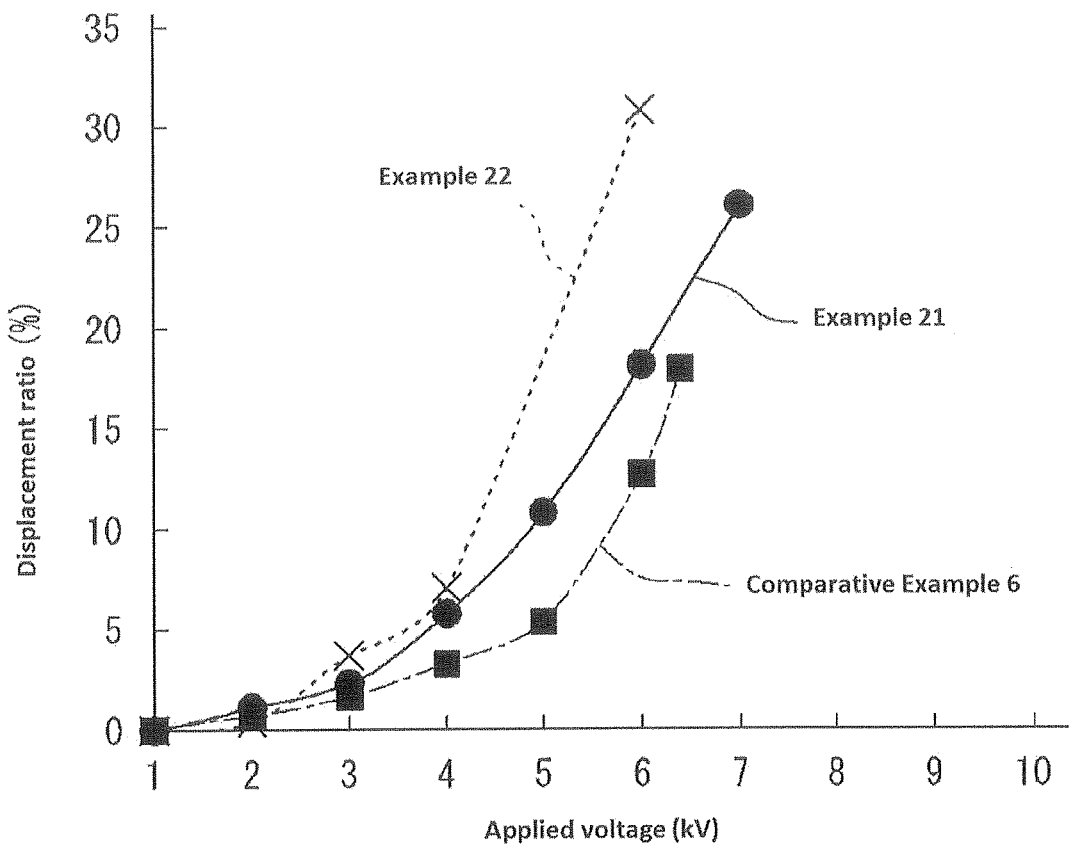
FIG. 3 is a graph showing the relationship between the voltage applied to the actuator obtained in Example 21, Example 22, and Comparative Example 6 and the percentage change in displacement of the actuators.

A voltage was applied to the electrode of the actuator obtained above, and the displacement and the percentage change thereof of the actuator when the voltage was raised were studied based on the following method. As a result, the displacement of the actuator when the applied voltage was 4 kV was 0.26 mm, and the percentage change thereof was 5.8%. FIG. 3 shows the results of measuring the percentage change in the displacement of the actuator when the voltage was raised. FIG. 3 is a graph showing the relationship between the applied voltage to the actuator and the percentage change in displacement of an actuator (the same applies hereinafter).

[Displacement and Percentage Change Thereof]

A displacement measuring marker was affixed on one of the electrodes of an actuator. The displacement (mm) of the marker when a direct voltage was applied with a voltage amp [Matsusada Precision Inc., model number: HEOPS-10B2] between the electrodes was measured with a displacement gauge [Keyence Corporation, model number: LK-GD500], and then the percentage change in the displacement was found based on the equation:

[Percentage change in displacement (%)]=[(displacement (mm)/radius of electrode before application of voltage (mm))]×100.

Example 22

The conductive film obtained in Example 2 was used to make an actuator in the same manner as Example 21. A voltage was applied to the electrode of the actuator, and the displacement and the percentage change thereof of the actuator when the voltage was raised were studied in the same manner as Example 21. As a result, the displacement of the actuator when the applied voltage was 4 kV was 0.321 mm, and the percentage change thereof was 7.1%. FIG. 3 shows the results of measuring the percentage change in the displacement of the actuator when the voltage was raised.

Comparative Example 6

An actuator was made in the same manner as Example 21, other than applying carbon grease [Kitaco Co., Ltd.] that is commonly used as an electrode of actuators in Example 21 so that the thickness after drying would be 0.05 mm instead of pasting on the conductive film obtained in Example 1. A voltage was applied to the electrode of the actuator, and the displacement and the percentage change thereof of the actuator when the voltage was raised were studied in the same manner as Example 21. As a result, the displacement of the actuator when the applied voltage was 4 kV was 0.15 mm, and the percentage change thereof was 3.4%. FIG. 3 shows the results of measuring the percentage change in the displacement of the actuator when the voltage was raised.

It can be understood from the results shown in FIG. 3 that the actuators obtained in Examples 21 and 22 not only have a larger displacement of the actuator when a voltage has been raised, but also a higher percentage change in the displacement even at a low applied voltage compared to Comparative Example 6.

As disclosed above, the present invention is exemplified by the use of its preferred embodiments. However, it is understood that the scope of the present invention should be interpreted based solely on the Claims. The present application claims priority to Japanese Patent Application No. 2016-183308 (filed on Sep. 20, 2016). The entire content thereof is incorporated herein by reference. It is also understood that any patent, any patent application, and any other references cited herein should be incorporated herein by reference in the same manner as the contents are specifically described herein.

INDUSTRIAL APPLICABILITY

The (meth)acrylic conductive material of the invention forms a conductive film with excellent usability and formability and with excellent flexibility and elongation in a wide range of electrical resistance change ratios. The conductive film of the invention has expectation for use in conductive parts of, for example, actuators, sensors used in industrial robots or the like, wiring, electrodes, substrates, power generating elements, speakers, microphones, noise cancellers, transducers, artificial muscles, small pumps, medical instrument, and the like.

REFERENCE SIGNS LIST

1 Actuator
2 Film
3a Electrode
3b Electrode
4a Terminal
4b Terminal
5a Conducting wire
5b Conducting wire
6 Power source
7 Marker
8 Displacement gauge

The invention claimed is:

1. A (meth)acrylic conductive material comprising a (meth)acrylic elastomer and a conductive agent, wherein the (meth)acrylic elastomer is prepared by polymerizing a monomer component comprising a (meth)acrylic monomer represented by formula (I):

[Chemical Formula 1]

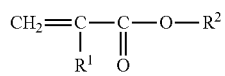
(I)

wherein $R^1$ indicates a hydrogen atom or a methyl group, and $R^2$ indicates an alkyl group with 1 to 10 carbon atoms, the alkyl group optionally having a hydroxyl group or a halogen atom or an alkoxyalkyl group with 2 to 12 carbon atoms optionally having a hydroxyl group, and the (meth)acrylic elastomer is characterized by a weight average molecular weight of 2 million to 3 million, and a molecular weight distribution (weight average molecular weight/number average molecular weight) of 1 to 6, and wherein the monomer component does not comprise an unsaturated nitrile monomer.

2. The (meth)acrylic conductive material of claim 1, wherein the monomer component comprises a (meth)acrylic monomer represented by formula (I) wherein $R^2$ is an unsubstituted alkyl group.

3. The (meth)acrylic conductive material of claim 2, wherein $R^2$ is an alkyl group with 1 to 4 carbon atoms.

4. The (meth)acrylic conductive material of claim 3, wherein $R^2$ is ethyl.

5. The (meth)acrylic conductive material of claim 1, wherein the monomer component further comprises an additional (meth)acrylic monomer represented by formula (I) in which $R^2$ is an alkyl group with 1 to 10 carbon atoms having a hydroxyl group, or further comprises an acrylic acid.

6. The (meth)acrylic conductive material of claim 5, wherein the monomer component comprises 2-hydroxyethyl acrylate.

7. A conductive film formed from the (meth)acrylic conductive material of claim 1.

8. An actuator prepared by using the conductive film of claim 7.

9. A method of manufacturing a (meth)acrylic conductive material comprising a (meth)acrylic elastomer and a conductive agent, characterized by:

polymerizing a monomer component comprising a (meth)acrylic monomer represented by formula (I):

[Chemical Formula 2]

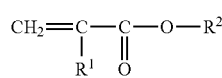
(I)

wherein $R^1$ indicates a hydrogen atom or a methyl group, and $R^2$ indicates an alkyl group with 1 to 10 carbon atoms, the alkyl group optionally having a hydroxyl group or a halogen atom or an alkoxyalkyl group with 2 to 12 carbon atoms optionally having a hydroxyl group to prepare a (meth)acrylic elastomer with a weight average molecular weight of 2 million to 3 million and a molecular weight distribution (weight average molecular weight/number average molecular weight) of 1 to 6, and wherein the monomer component does not comprise an unsaturated nitrile monomer; and mixing the resulting (meth)acrylic elastomer and the conductive agent.

10. The method of claim 9, wherein the polymerization is bulk polymerization.

* * * * *